(12) United States Patent
Chen et al.

(10) Patent No.: US 8,595,753 B2
(45) Date of Patent: *Nov. 26, 2013

(54) VIRTUAL MACHINE INTERFACE FOR HARDWARE RECONFIGURABLE AND SOFTWARE PROGRAMMABLE PROCESSORS

(75) Inventors: Song Chen, San Jose, CA (US);
Kenneth M. Hesky, Sunnyvale, CA (US); Raju R. Joag, San Jose, CA (US);
Joel D. Medlock, Campbell, CA (US);
Christopher C. Woodthorpe, Los Gatos, CA (US)

(73) Assignee: Infineon Technologies AG, Neubiberg (DE)

(*) Notice: Subject to any disclaimer, the term of this patent is extended or adjusted under 35 U.S.C. 154(b) by 165 days.

This patent is subject to a terminal disclaimer.

(21) Appl. No.: 13/223,839

(22) Filed: Sep. 1, 2011

(65) Prior Publication Data

US 2012/0030692 A1 Feb. 2, 2012

Related U.S. Application Data

(60) Division of application No. 11/841,848, filed on Aug. 20, 2007, now Pat. No. 8,020,176, which is a continuation of application No. 09/828,381, filed on Apr. 5, 2001, now Pat. No. 7,703,107.

(60) Provisional application No. 60/195,096, filed on Apr. 6, 2000.

(51) Int. Cl.
*G06F 9/44* (2006.01)
*G06F 9/46* (2006.01)
*G06F 9/455* (2006.01)

(52) U.S. Cl.
USPC .............................. 719/328; 713/100; 718/1

(58) Field of Classification Search
USPC ............................... 719/328; 718/1; 713/100
See application file for complete search history.

(56) References Cited

U.S. PATENT DOCUMENTS

| | | |
|---|---|---|
| 4,475,156 A | 10/1984 | Federico et al. |
| 4,787,026 A | 11/1988 | Barnes et al. |
| 5,067,072 A | 11/1991 | Talati et al. |
| 5,095,427 A | 3/1992 | Tanaka et al. |
| 5,101,346 A | 3/1992 | Ohtsuki |
| 5,337,412 A | 8/1994 | Baker et al. |

(Continued)

OTHER PUBLICATIONS

Bi, et al., "Wireless Mobile Communications at the Start of the $21^{st}$ Centrury", IEEE Communications, Jan. 2001, pp. 110-116.

(Continued)

*Primary Examiner* — Van Nguyen
(74) *Attorney, Agent, or Firm* — Schiff Hardin LLP

(57) ABSTRACT

The present invention provides a virtual machine interface (VMI) and an application programming interface (API) usable in conjunction with a reconfigurable wireless network communication apparatus. The reconfigurable wireless network communication apparatus comprises a plurality of hardware kernels. The apparatus can be reconfigured to support different or modified communication protocols over time. The VMI comprises a library of software objects. By configuring VMI software objects, a programmer selects the communication protocol used by the reconfigurable wireless network communication apparatus. The API of the present invention provides higher level management of the communication protocol used by a reconfigurable wireless network communication apparatus. The API comprises a library of high level software objects that further abstract hardware details of the apparatus.

14 Claims, 14 Drawing Sheets

(56) References Cited

U.S. PATENT DOCUMENTS

| | | | |
|---|---|---|---|
| 5,414,812 A | 5/1995 | Filip et al. |
| 5,488,716 A | 1/1996 | Schneider et al. |
| 5,553,291 A | 9/1996 | Tanaka et al. |
| 5,608,720 A | 3/1997 | Biegel et al. |
| 5,699,428 A | 12/1997 | McDonnal et al. |
| 5,732,261 A | 3/1998 | Savitzky et al. |
| 5,845,215 A | 12/1998 | Henry et al. |
| 5,881,058 A | 3/1999 | Chen |
| 5,910,180 A | 6/1999 | Flory et al. |
| 5,974,049 A | 10/1999 | Ratcliff et al. |
| 5,999,990 A | 12/1999 | Sharrit et al. |
| 6,075,938 A | 6/2000 | Bugnion et al. |
| 6,075,939 A | 6/2000 | Bunnell et al. |
| 6,094,678 A * | 7/2000 | Nethercott et al. ........... 709/220 |
| 6,151,328 A | 11/2000 | Kwon et al. |
| 6,154,843 A | 11/2000 | Hart et al. |
| 6,182,010 B1 | 1/2001 | Berstis |
| 6,185,484 B1 | 2/2001 | Rhinehart |
| 6,230,307 B1 | 5/2001 | Davis et al. |
| 6,236,999 B1 | 5/2001 | Jacobs et al. |
| 6,269,391 B1 | 7/2001 | Gillepsie |
| 6,330,586 B1 | 12/2001 | Yates et al. |
| 6,434,617 B1 | 8/2002 | Clough et al. |
| 6,456,857 B1 | 9/2002 | Bos et al. |
| 6,539,438 B1 | 3/2003 | Ledzius et al. |
| 6,651,080 B1 | 11/2003 | Liang et al. |
| 6,741,608 B1 | 5/2004 | Bouis et al. |
| 6,754,219 B1 | 6/2004 | Cain et al. |
| 6,757,289 B1 | 6/2004 | Cain et al. |
| 6,757,895 B1 | 6/2004 | Beadle et al. |
| 6,763,327 B1 | 7/2004 | Songer et al. |
| 7,254,649 B2 | 8/2007 | Subramanian et al. |
| 7,703,107 B2 | 4/2010 | Chen et al. |

OTHER PUBLICATIONS

Drew, et al., "Evolution Toward Reconfigurable User Equipment", IEEE Communications, Feb. 2001, pp. 158-164.

Messerschmitt, "The Future of Computer-Telecommunications Integration", IEEE Communications, Apr. 1996, retrieved from divine.eecs.berkeely.edu/-messer/PAPERS/96/ComMag1/, on Dec. 8, 2000 at 1:17 p. m., 7 pages.

Schneiderman, "Study Views Software Radios As Future Design Equipment", Wireless Systems Design, Feb. 1999, 3 pages.

* cited by examiner

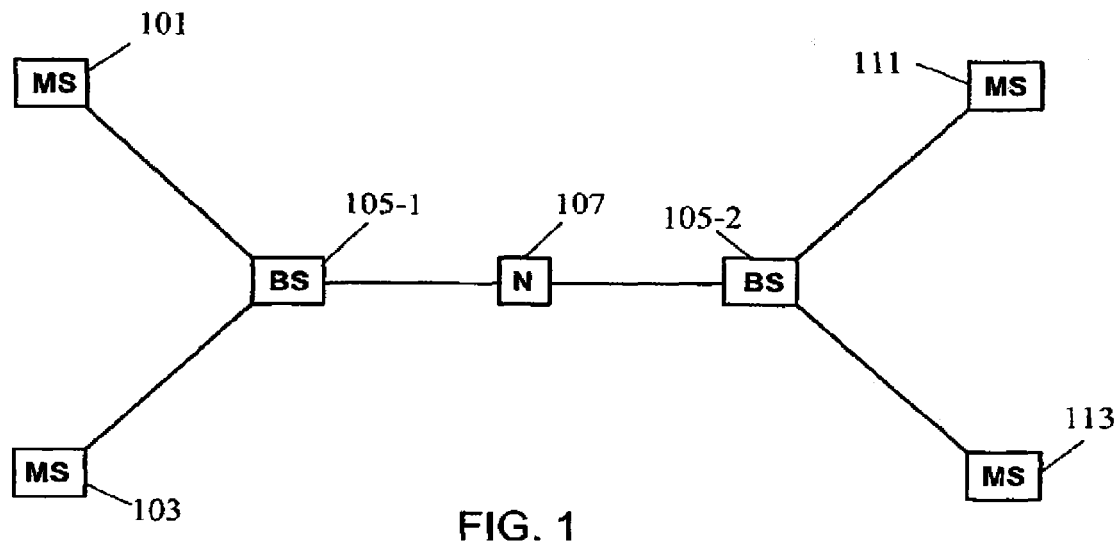
FIG. 1
Conventional

| | |
|---|---|
| CBME | 401 |
| CBME_New | 503 |
| CBME_Set_User-Data | 505 |
| CGU | 507 |
| CGU_New | 509 |
| CGU_Set_User_Data | 511 |
| Searcher | 413 |
| Searcher_New | 515 |
| Set_Searcher_Static_Attributes | 517 |
| Set_Searcher_Dynamic_Attributes | 519 |
| Searcher_Start | 521 |
| Searcher_Stop | 523 |
| Assign_DSM_To_Searcher | 525 |
| Searcher DSM | 421 |
| Searcher_DSM_New | 529 |
| Set_DSM_State_Attributes | 531 |
| Preamble Detection Engine (PDE) | 533 |
| PDE_New | 535 |
| PDE_Add_Antenna | 537 |
| Finger | 417 |
| Finger_New | 541 |
| Set_Finger_Static_Attributes | 543 |
| Set_Finger_Dynamic_Attributes | 545 |
| Finger_Start | 547 |
| Finger_Stop | 549 |
| Combiner | 411 |
| Combiner_New | 553 |
| Add_Finger_To_Combiner | 555 |
| Remove_Finger_From_Combiner | 557 |
| Combiner_Start | 559 |
| Combiner_Stop | 561 |
| Uplink | 403 |
| Uplink_New | 565 |
| Downlink | 567 |
| Downlink_New | 569 |
| Tx Multicode Channel (MTX) | 571 |
| MTX_New | 573 |

FIG. 5

VIRTUAL MACHINE INTERFACE FOR HARDWARE RECONFIGURABLE AND SOFTWARE PROGRAMMABLE PROCESSORS

This application is a division of Ser. No. 11/841,848 filed Aug. 20, 2007, now U.S. Pat. No. 8,020,176 which is a continuation of Ser. No. 09/828,381 filed Apr. 5, 2001 which claims priority to the U.S. patent application VIRTUAL MACHINE INTERFACE FOR HARDWARE RECONFIGURABLE AND SOFTWARE PROGRAMMABLE PROCESSORS, Ser. No. 09/828,381 that was filed Apr. 5, 2001, now U.S. Pat. No. 7,703,107, which claims priority to U.S. Provisional Patent Application VIRTUAL MACHINE INTERFACE AND APPLICATION PROGRAMMING INTERFACE FOR HARDWARE RECONFIGURABLE AND SOFTWARE PROGRAMMABLE PROCESSOR, Ser. No. 60/195,096 that was filed Apr. 6, 2000.

CROSS-REFERENCE TO RELATED APPLICATIONS

Related applications incorporated herein by reference are as follows:
A CONFIGURABLE CODE GENERATOR SYSTEM FOR SPREAD SPECTRUM APPLICATIONS, U.S. patent application Ser. No. 09/751,782, filed Dec. 29, 2000, now U.S. Pat. No. 6,567,017.
APPARATUS AND METHOD FOR CALCULATING AND IMPLEMENTING A FIBONACCI MASK FOR A CODE GENERATOR, U.S. patent application Ser. No. 09/751,776, filed Dec. 29, 2000, now U.S. Pat. No. 6,947,468.
A FAST INITIAL ACQUISITION AND SEARCH DEVICE FOR A SPREAD SPECTRUM COMMUNICATION SYSTEM, U.S. patent application Ser. No. 09/751,777, filed Dec. 29, 2000, now U.S. Pat. No. 7,031,376.
A CONFIGURABLE MULTIMODE DESPREADER FOR SPREAD SPECTRUM APPLICATIONS, U.S. patent application Ser. No. 09/751,785, filed Dec. 29, 2000, now U.S. Pat. No. 6,934,319.
A CONFIGURABLE ALL-DIGITAL COHERENT DEMODULATOR SYSTEM FOR SPREAD SPECTRUM APPLICATIONS, U.S. patent application Ser. No. 09/751,783, filed Dec. 29, 2000, now U.S. Pat. No. 7,010,061.
A WIRELESS SPREAD SPECTRUM COMMUNICATION PLATFORM USING DYNAMICALLY RECONFIGURABLE LOGIC, U.S. patent application Ser. No. 09/772,584, filed Jan. 29, 2001, now abandoned.
UNIVERSAL CODE GENERATION, Ser. No. 60/222,829, filed Aug. 3, 2000.

MICROFICHE APPENDIX

A microfiche appendix entitled "Appendix A, Cellular Basestation Modem Engine (CBME) Virtual Machine Interface Specification, Document Version 2.01," is included in the present application. The microfiche appendix includes 2 microfiche cards.

BRIEF DESCRIPTION OF THE INVENTION

This invention relates generally to application programming interfaces. More particularly, this invention relates to a virtual machine interface and/or application program interface.

BACKGROUND OF THE INVENTION

A cellular communication system is a wireless communication network in which geographical areas are divided into a number of smaller areas or cells in order to provide scalability of coverage for multiple users with minimal intercell interference. A mobile cellular communication system is a cellular communication network in which the terminal devices (users, mobiles) may be in motion from one location to another relative to a basestation.

In a typical digital wireless communication system, multiple basestations are provided to perform switching and connection services between users or terminal devices. FIG. 1 illustrates typical cellular wireless communication system architecture. Basestation 105-1 provides wireless communication system to mobile stations 101 and 103. Similarly, basestation 105-2 provides wireless communication system to mobile stations 111 and 113. Basestation 105-1 is connected to the basestation 105-2 via network 107.

Referring to FIG. 1, a basestation (BS) provides basic connection service to terminal devices by terminating the radio path and connecting the terminal devices to network 107. A mobile station (MS) terminates the radio path on the user side and enables the user to gain access to services from the network. Network 107 typically comprises a mobile switching center (MSC). The MSC is an automatic system that interfaces the user traffic from the wireless network with the wireline network or other wireless networks. The basestations exchange messages with the MSC.

A variety of communication protocols can be used to operate and control a wireless communication system such as the system shown in FIG. 1. Representative protocols include, but are not limited to, the TDMA (time division multiple access) and CDMA (code division multiple access) protocol families. Among other adoptions, TDMA protocol is used by GSM (Global System for Mobile Communication) which comprises GPRS (General Packet Radio Service), ECSD (Enhanced Circuit Switched Data), and EDGE (Enhanced Data rates for Global Evolution) systems. The CDMA protocol is adopted by cdma2000, wideband CDMA (WCDMA), IS-95 CDMA, IS-95B CDMA, CDMA TIA IS2000, TIA IS 2000A, WIMS W-CDMA, ARIB WCDMA, 1Xtrem, 3GPP-FDD, 3GPP-TDD, TD/SCDMA, as well as several other multi-carrier CDMA systems. Additional 2G and/or 3G CDMA protocols may be found in *WDCDMA for UMTS*, Holma and Toskala eds., John Wiley & Sons. Inc., New York, (2000); and *IS-95 CDMA and cdma2000*, Garged., Prentice Hall PTR, Upper Saddle River, N.J., (2000).

Although TDMA and CDMA are the most widely used communication protocols, they each have unique system requirements. Prior art communication systems dedicated to supporting TDMA or CDMA protocols exist. However, the prior art has failed to provide a communication system that is capable of supporting several different protocols, including both TDMA and CDMA, in a satisfactory manner. This failure is in part due to the fact that the hardware necessary to support TDMA is typically not compatible with the hardware necessary to support CDMA. For example, typical TDMA systems require maximum likelihood sequence estimation (MLSE) equalization whereas CDMA systems do not. In contrast, typical CDMA systems require RAKE receivers whereas TDMA systems do not.

Even within the same protocol family, there are variations in the hardware necessary to support the protocol. For example, although both the global positioning system (GPS) and IS-95 are CDMA protocols, GPS and IS-95 have distinctly different hardware requirements. For example, an IS-95 system requires a convolutional decoder whereas GPS does not.

Because of the unique hardware requirements necessary to support each of the existing communication protocols, substantial expense is required to modify a basestation so that it supports a new communication protocol. Indeed, such a modification requires a complete or partial overhaul of a basestation. In prior art systems, the modification of a basestation to support a new communication protocol requires the installation of new equipment as well as significant modification of existing software throughout the network. In addition, new terminal devices are required in order to be compatible with the modified basestation. Thus, modification of a communication protocol used by a basestation 105 is an expensive and time-consuming task that results in service interruptions. For these reasons, conventional wireless communication systems suffer from a lack of flexibility and adaptability, and cannot provide timely and efficient adaptation to meet the ever-changing needs of the wireless communication field.

Further, in conventional wireless communication systems, preparing an application program to run a particular communication protocol requires a programmer to know or understand the complex details and specifics of the underlying communication hardware. Thus, every time there is a change in communication protocol, the programmer has to first understand what changes are to be made at the hardware level and rewrite application programs accordingly. Such dependence on specific architecture of the underlying hardware makes it even more difficult and expensive to change and maintain wireless communication systems.

In view of the foregoing, it is highly desirable to provide an adaptable and flexible wireless communication system. Also, it is desirable to provide a hardware architecture-independent communication platform on which a programmer can write application programs capable of modifying the communication protocol used by a reconfigurable wireless network communication apparatus without understanding underlying hardware requirements necessary to affect such a modification.

SUMMARY OF THE INVENTION

The present invention provides an object-oriented reconfigurable multi-protocol communication system comprising a virtual machine interface (VMI) and an application programming interface (API) for use in a wireless communication network. The wireless communication network includes a reconfigurable wireless network communication apparatus having a plurality of hardware kernels and an interconnect structure. The wireless network communication apparatus is configurable in accordance with a designated communication protocol. The VMI is disposed between an application translation layer and a software virtual machine, and comprises a library of software procedures or objects.

In one embodiment, the software objects of the VMI are hierarchically related. Software objects of the VMI have static attributes and/or have dynamic attributes. The static attributes are adjustable when the reconfigurable wireless network apparatus, or components thereof, is off-line. The dynamic attributes are adjustable regardless of whether the reconfigurable wireless network apparatus is off-line or on-line.

The software objects of the VMI are associated with hardware kernels in the underlying reconfigurable wireless network communication apparatus, so that manipulation of VMI software objects regulate operations in the respective associated hardware kernels of the reconfigurable wireless network communication apparatus. Therefore, by appropriate manipulation or programming of the VMI software objects, a programmer can control essential functionality within the underlying reconfigurable wireless network communication apparatus without delving into the details and specifics of the reconfigurable wireless network communication apparatus.

A unique advantage of the present invention is that basestation conversion from one communication protocol to another is possible without expensive hardware changes. Rather, such changes are made by appropriate programming or manipulation of the VMI or API.

One embodiment of the invention is directed to CDMA (code division multiple access) applications. In this embodiment, the VMI provides the following software objects: a CDMA basestation engine, a searcher, a code generation unit (CGU), a finger, an uplink and a downlink. In turn, the reconfigurable wireless network communication apparatus provides a searcher kernel, a CGU kernel, a finger kernel, an uplink kernel and a downlink kernel. Each of these kernels are associated with corresponding software objects within the VMI. For example, a VMI finger object is associated with a finger kernel, a VMI searcher object is associated with a searcher kernel, and so forth.

The present invention further provides an application program interface (API) to manage utilization, scheduling, and resource allocation. The API of the present invention comprises a library of higher-level software objects that further abstract the details and specifics of the VMI so that the application programmer can change the communication protocol used by a reconfigurable wireless network communication apparatus using very simple application programs. Indeed, in some embodiments, the API allows a programmer to change the communication protocol used by an apparatus by selecting an option in a simple menu of options. In one embodiment of the present invention, the API provides a standard uniform platform through which the programmer changes the wireless communication protocol used by a reconfigurable wireless network communication apparatus without having to understand the VMI, the details of the underlying hardware of the apparatus, or the requirements and specifications of the selected wireless communication protocol.

In another aspect of the present invention, the API has (i) a parsing routine for parsing an application program that designates a communication protocol and (ii) a machine instruction generation routine for producing machine readable data capable of reconfiguring a wireless network communication apparatus in accordance with a communication protocol designated by the application program. In some embodiments, in accordance with this aspect of the present invention, the machine readable data comprise VMI objects.

BRIEF DESCRIPTION OF THE DRAWINGS

For a better understanding of the invention, reference should be made to the following detailed description taken in conjunction with the accompanying drawings, in which:

FIG. 1 illustrates a typical wireless communication system architecture;

FIG. 5 illustrates examples of various VMI objects in accordance with one embodiment of the present invention;

Like reference numerals refer to corresponding parts throughout the drawings.

DETAILED DESCRIPTION OF THE INVENTION

Reference will now be made in detail to the preferred embodiments of the invention, examples of which are illustrated in the accompanying drawings. While the invention will be described in conjunction with preferred embodiments, it is understood that the description is not intended to limit the invention to these embodiments. Rather, the invention is intended to cover alternatives, modifications and equivalents, which may be included within the spirit and scope of the invention, as defined by the appended claims. Additionally, in the following detailed description of the present invention, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to obscure important aspects of the present invention. Furthermore, while the present invention may be implemented in a reconfigurable wireless network communication apparatus such as a digital wireless communication system, the methods of the present invention are also well suited for other applications and devices.

Representative reconfigurable wireless network communication apparatuses include, but are not limited to, fixed wireless, unlicensed (FCC) wireless, local area network (LAN), cordless telephony, cellular telephony, personal basestation, and telemetry. Other applications include navigation, encryption, and other digital data processing applications.

The present invention provides an application program interface (API) and a virtual machine interface (VMI) to abstract details of the underlying reconfigurable wireless network communication apparatus so that an application programmer can prepare and modify an application program without requiring knowledge about the configuration, control or management of the underlying communication hardware. Combined with an API, the VMI gives a programmer the ability to adapt to the various communication protocols by invoking specific API and VMI software objects or programs without the need to directly program the hardware of the underlying reconfigurable wireless network communication apparatus. For example, a mobile station programmer can program a mobile station so that it communicates using a new or altered communication protocol by use of the VMI and API rather than directly accessing the registers of the mobile station hardware.

Figure 2:
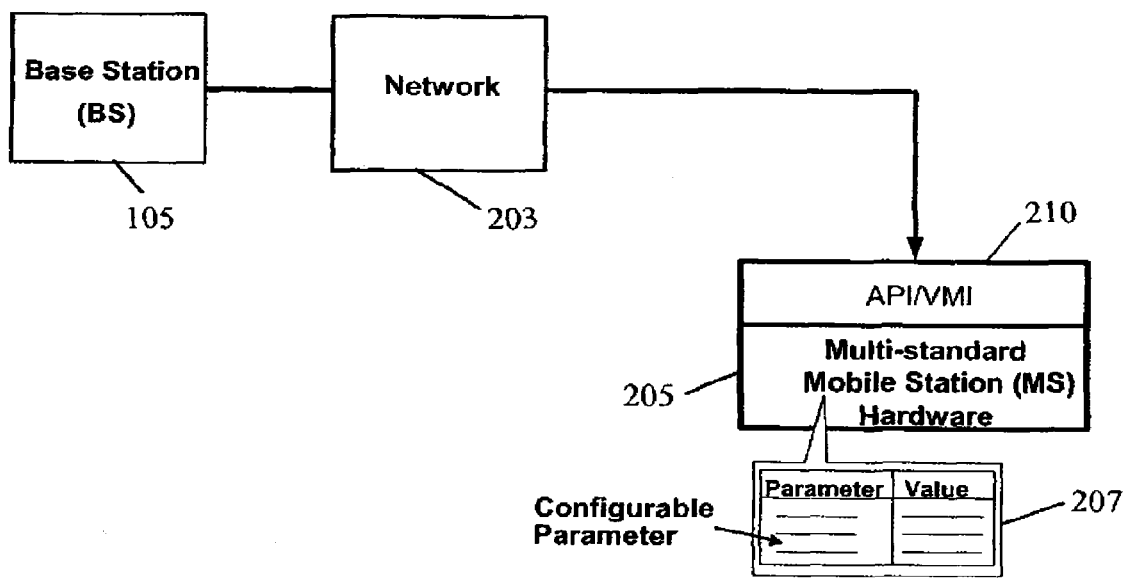
FIG. 2 illustrates one embodiment of the invention utilizing a VMI interface between the network and mobile station hardware.

FIG. 2 illustrates one embodiment of the VMI and API of the present invention in conjunction with a reconfigurable wireless network communication apparatus. In FIG. 2, basestation 105 communicates with a multi-protocol mobile station 205 via network 203. The hardware of mobile station 205 can be configured to work with various communication protocols by changing the values of configurable parameters of table 207. The underlying hardware is controlled by API/VMI 210. Mobile station 205 has a reconfigurable hardware architecture. The VMI and API of the present invention serves as an interface between the mobile station hardware and network 203 so that application programs can be developed and prepared independently of the details and specifics of mobile station hardware 205.

In a preferred embodiment, both the VMI and API are implemented as software procedures or objects. It will be apparent to one skilled in the art that in alternate embodiments of the invention, the VMI and API can also be implemented as hardware. For instance, VMI and API implementations can be implemented as logic on a programmable chip.

In alternate embodiments of the present invention, the VMI and API may be used in conjunction with a basestation and its base transceiver station (BTS) engine. Serving as an interface between the BTS engine and network 203, the VMI and API enable the programmer to manipulate the reconfigurable BTS hardware by manipulating the VMI and API instead of directly controlling and modifying the BTS hardware. In such embodiments, the BTS hardware comprises multiple hardware kernels, which are configurable into several modes of operation, and parameterizable according to the demands of particular communication protocols such as TDMA and CDMA (code division multiple access). For example, the BTS engine may comprise one or more searchers, fingers, code generation units (CGUs), searcher dwell state machines (DSMs), combiners, uplinks, matched filters, matched filter antennas, downlinks, and transmit multicode channel kernels. Each of these kernels is interconnected by a reconfigurable interconnect structure having flexible bandwidth characteristics. Such a reconfigurable BTS engine is described in U.S. patent application Ser. No. 09/772,584, now abandoned.

While the methods of the present invention advantageously regulate the communication protocol(s) used by a base station or mobile, it will be apparent to one skilled in the art that the VMI and/or API of the present invention may also be used in conjunction with hardware units other than a mobile station or basestation as long as the underlying hardware unit has a reconfigurable architecture. Indeed, the VMI and/or API of the present invention may be used with any reconfigurable wireless network communication apparatus.

Figure 3:
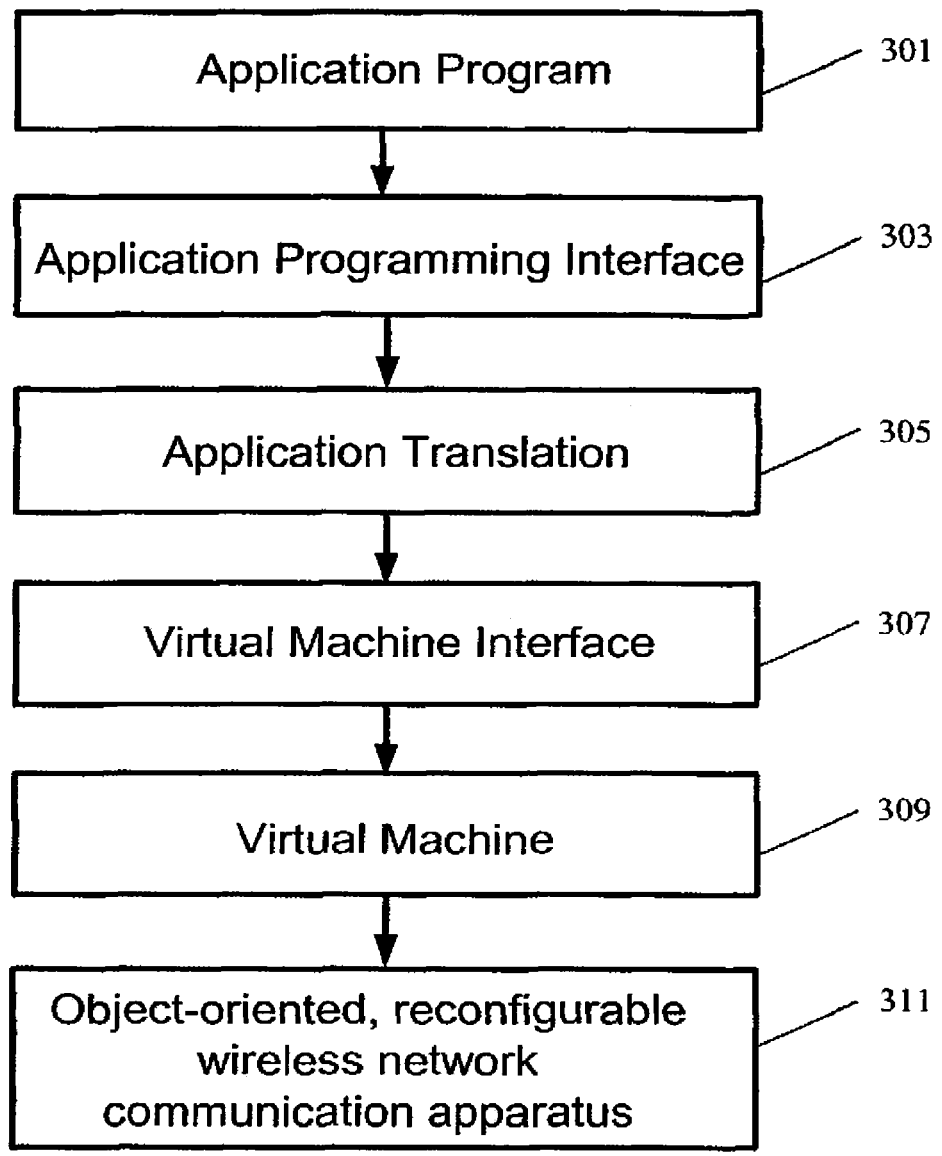
FIG. 3 illustrates one embodiment of the VMI and the API constructed in accordance with the invention.

Turning to the details of the invention, FIG. 3 illustrates one embodiment of the VMI and the API constructed in accordance with the present invention. API 303 is disposed between an application translation layer 305 and an application program 301. VMI 307 is disposed between the application translation layer 305 and a virtual machine layer 309, which, in turn, is connected to a reconfigurable wireless network communication apparatus 311. The reconfigurable wireless network communication apparatus 311 may comprise basestation hardware, mobile station hardware, or any other suitable hardware.

Specifically, API 303 abstracts details and specifics of the lower level functionality and implementation of the communication system from the programmer. Such details and specifics include application translation layer 305, VMI 307, virtual machine 309 and reconfigurable wireless network communication apparatus 311. Thus, the programmer can prepare and modify a program without having to worry about the configuration, control or management of the underlying reconfigurable wireless network communication apparatus.

In one embodiment of the invention, API 303 provides an interface for writing high level programs that are translated by application translation layer 305 into programs that may include VMI commands. The translated programs, in turn, affect the communication protocol used by reconfigurable wireless network communication apparatus 311. As a result, API 303 abstracts information as to the types and numbers of VMI objects-necessary to effect a given communication protocol as well as parameter values associated with VMI objects used to implement the given wireless communication protocol. Thus, in one embodiment, the programmer only has to provide application program 301 with information as to the type of communication protocol of interest. An example of an application program in accordance with the embodiment is provided by illustrative code line 401.

(401) Set_Communication_Protocol=WCDMA;

In illustrative code line 401, the programmer sets the communication protocol for a reconfigurable wireless network communication apparatus to WCDMA.

In other embodiments in accordance with the present invention, Application programming interface 303 and application translation 305 are not used. Rather, a programmer writes a program in a language such as ANSI C that includes program calls to specific VMI objects. In this way, the programmer is able to modify or change the communication protocol or the usage of a communication protocol by reconfigurable wireless network communication apparatus 311.

From the perspective of the programmer, by abstracting the details and specifics as to the types and numbers of the VMI objects and relevant parameters, API 303 provides a communication protocol-independent interface through which the programmer can control and operate the underlying reconfigurable wireless network communication apparatus 311. This convenience makes it possible to standardize the wireless communication architecture because an API can be developed as a uniform, standard platform on which the user can operate and control various wireless communication protocols.

VMI 307, in turn, abstracts from the user details and specifics of the lower level implementation-virtual machine 309 and reconfigurable wireless network communication apparatus 311. In one embodiment of the present invention, VMI 307 provides a library of software calls for application program 301. VMI 307 contains information as to the types and numbers of objects as well as the parameter values associated with the objects necessary to implement a selected wireless communication protocol.

VMI 307 gives the programmer complete access to and control of reconfigurable wireless network communication apparatus 311 without the need to directly control or access the apparatus. For example, when used to implement a CDMA basestation, VMI 307 provides a hierarchical command structure including commands that control mobile and sector allocation of resources of the underlying reconfigurable wireless network communication apparatus 311. VMI 307 also provides commands that control datapath interconnection, as well as hardware kernel parameters.

In operation, a particular communication protocol is selected, and the application program 301 makes the appropriate calls to software routines of API 303. Application program 301 is then translated by application translation layer 305. The software routines of application translation layer 305 have the information as to the types and numbers of the objects required to perform the particular communication protocol.

In alternate embodiments, the methods and apparatuses of the present invention are practiced without API 303. In such embodiments, application program 301 makes calls to necessary software objects of VMI 307. For example, when the user selects a communication protocol and prepares an application program 301 to execute the communication protocol, application program 301 makes calls directly to software objects in VMI 307. The programmer can instantiate and use any object available from VMI 307 to perform necessary functions according to the selected communication protocol. After instantiating a particular object, the programmer assigns relevant parameter values to the instantiated objects in accordance with the particular communication protocols selected.

In one embodiment, after application program 301 is translated into a program readable by virtual machine 309, virtual machine 309 issues machine readable instructions and commands to the reconfigurable wireless network communication apparatus 311 for execution. Unlike application program 301 and API 303, virtual machine 309 requires general knowledge and information associated with underlying reconfigurable wireless network communication apparatus 311. Using such knowledge, virtual machine 309 translates the application program into lower level machine code that is required to control the underlying reconfigurable wireless network communication apparatus 311. Typically, virtual machine 309 comprises a memory manager, thread scheduler, interpreter, as well as a compiler in order to control and coordinate the performance and execution of the underlying reconfigurable wireless network communication apparatus 311.

Typically, the reconfigurable wireless network communication apparatus 311 includes a resource allocator that receives and processes instructions and commands from the virtual machine 309 to allocate and reconfigure the necessary hardware resources of the reconfigurable wireless network communication apparatus 311. Thus, the scheduling and resource allocation of the underlying hardware 311 are transparent to the user. The resource allocation and hardware reconfiguration of the reconfigurable wireless network communication apparatus 311 is described in U.S. patent application Ser. No. 09/772,584, now abandoned.

One advantage of including VMI 307 between virtual machine 309 and any user program is to use the VMI to abstract details and specifics of the underlying hardware, such as register values. The specifics and details of the underlying reconfigurable wireless network communication apparatus 311 are handled by virtual machine 309. Thus, regardless of the type of communication protocol used, the programmer can instantiate and use the Cellular Basestation Modem Engine (CBME), searcher, CGU, uplink, and matched filter objects available within VMI 307. In one embodiment of the present invention, the programmer does not have to handle any level lower than VMI 307 in order to program a particular reconfigurable wireless network communication apparatus. Specifically, the user can control the underlying reconfigurable wireless network communication apparatus 311 by manipulating the objects in VMI 307 instead of directly controlling and accessing the underlying hardware of the reconfigurable wireless network communication apparatus 311.

In one embodiment of the present invention, there is at least one hardware kernel assigned to reconfigurable wireless network communication apparatus 311 for each instantiated software object of VMI 307. For example, if CBME, searcher, CGU, uplink, and matched filter objects are instantiated from VMI 307, there is at least one CBME engine, searcher, CGU, uplink, and matched filter kernel assigned in the reconfigurable wireless network communication apparatus 311. This relationship between the VMI and the underlying hardware makes it easier for a user to prepare and analyze an application program, and shortens the time for the user to convert from one communication protocol to another. For example, in order to convert from W-CDMA protocol to IS-2000, the user instantiates additional objects as necessary, deletes unnecessary objects, and assigns parameter values as appropriate for the new protocol, thereby effectively modifying the underlying reconfigurable wireless network communication apparatus 311.

Figure 4:
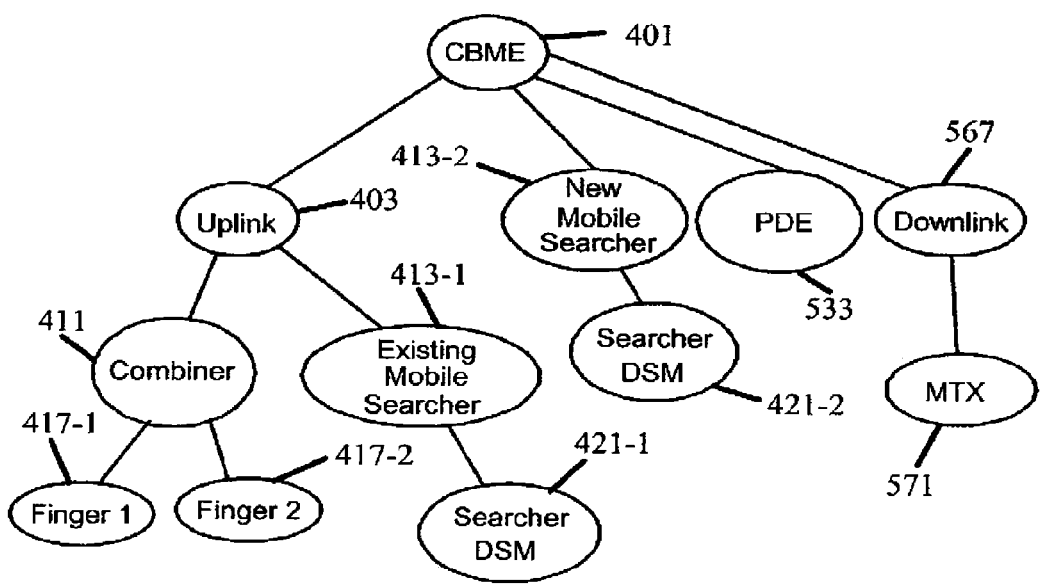
FIG. 4 illustrates one embodiment of VMI 307 software objects in accordance with the present invention.

FIG. 4 illustrates one embodiment of VMI 307 constructed in accordance with the present invention. Typically, objects in VMI 307 have a hierarchical relationship. The exemplary embodiment of FIG. 4 uses an object-oriented programming technique and provides various objects at different levels of the hierarchy: CDMA basestation modem engine (CBME) 401, uplink 403, searchers 413-1 and 413-2, searcher DSM 421-1 and 421-2, preamble detection engine (PDE) 533, "finger1" 417-1, "finger2" 417-2, combiner 411, and Downlink 567 with one or more Tx multicode channels 571. In FIG. 4, CBME 401 is the highest level object and other objects lower in the hierarchy are associated, directly or indirectly, with CBME 401.

Although certain software objects have been described with respect to FIG. 4 for the purpose of illustration, one of skill in the art will appreciate that other suitable software objects may be created and utilized as the system requires. For example, an encoder/decoder object may be added.

Turning attention to FIG. 5, each object within VMI 307 may comprise one or more associated functions or objects. Each of the objects within VMI 307 is associated with one or more hardware kernels so that changes in the object affect the state of the associate hardware kernel. In some embodiments, each object within VMI 307 is assigned to a unique or different hardware kernel. However, one of skill in the art will appreciate that many other configurations are possible, including configurations where one or more VMI objects are assigned to the same hardware kernel, or the inverse configuration, in which one or more hardware kernels are assigned to the same VMI object. Each of the software objects illustrated in FIG. 5 will now be described. In this description, both the purpose of the software object and the function of the underlying hardware to which the software object is associated are provided.

Cellular Basestation Modem Engine 401

A cellular basestation modem engine (CBME) kernel is a reconfigurable wireless network communication apparatus which itself is composed of a plurality of kernels to facilitate wireless communication. In one embodiment, CBME is a Morphics cellular base transceiver system (BTS). CBME object 401 is a software object within VMI 307 that regulates various aspects of the underlying CBME hardware. CBME object 401 includes associated functions CBME_new 503 and CBME_set_user-data 505. CBME_new 503 is invoked to allocate a new CBME object. CBME_set_user_data 505 is used to write user data to a CBME object.

Code Generation Unit 507

The CBME kernel includes one or more code generation unit (CGU) kernels. The on-chip CGU kernels are object-specific in that each on-chip CGU kernel only works with one type of VMI object. In one embodiment of the present invention, a particular CGU kernel only works with an Uplink 403, Searcher 413, a preamble detection engine antenna object, or a downlink object 567. Illustrative CGU kernels in accordance with various embodiments of the present invention are disclosed in "A configurable code generator system for spread spectrum applications," U.S. patent application Ser. No. 09/751,782, filed Dec. 29, 2000, now U.S. Pat. No. 6,567,017; "Apparatus and method for calculating and implementing a Fibonacci mask for a code generator," U.S. patent application Ser. No. 09/751,776, filed Dec. 29, 2000, now U.S. Pat. No. 6,947,468; "Universal code generation," U.S. Ser. No. 60/222,829, filed Aug. 3, 2000; and "A Wireless Spread Spectrum Communication Platform Using Dynamically Reconfigurable Logic," U.S. patent application Ser. No. 09/772,584, filed Jan. 29, 2001, now abandoned.

In some embodiments of the present invention, the CGU unit kernel provides all required codes among a set of standards, including but not limited to IS-95, cdma2000, IS2000, ARIB, and 3GPP. Various codes are generated for both uplink and downlink requirements. In some embodiments of the present invention, CGU kernels contain timing information for a modem and for each individual finger of a RAKE receiver. In additional embodiments of the present invention, the CGU contains a mask generation unit, which is used to transform a given code offset into a set of code dependent parameters. Such parameters are used in the reassignment of a code's phase. The output of a CGU kernel is a pseudo-random noise code sequence for the downlink and each RAKE finger.

Code generation unit (CGU) object 507 includes functions such as CGU_new 509 and CGU_set_user_data 511. CGU_new 509 is invoked to allocate a new CGU object 507 and object CGU_set_user_data 511 is used to write user data to a CGU object 507.

Searcher 413

In a spread spectrum system, basestations as well as some handsets transmit a standardized pilot signal having a known sequence of binary digits to aid in communication of data signals. These pilot signals can have a wide variety of codes, as determined by a specific communication protocol. For example, in one protocol a pilot signal has a length of $2^{15}$ (32,768) bits (or chips). This known sequence is referred to as a short pseudonoise (PN) sequence in IS-95 CDMA.

A searcher kernel is designed to search for new multi-paths by correlating a received code sequence such as a short PN sequence having an unknown phase with a second code sequence that is a locally generated PN sequence with a known phase. Once a searcher kernel finds a multi-path, a finger kernel is assigned to the multipath. Searcher kernels in accordance with the present invention are disclosed in "A Fast Initial Acquisition and Search Device for a Spread Spectrum Communication System," U.S. patent application Ser. No. 09/751,777, filed Dec. 29, 2000, now U.S. Pat. No. 7,031,376; "A Configurable Multimode Despreader for Spread Spectrum Applications," U.S. patent application Ser. No. 09/751,785, filed Dec. 29, 2000, now U.S. Pat. No. 6,934,319; "A Configurable All-Digital Coherent Demodulator System For Spread Spectrum Applications," U.S. patent application Ser. No. 09/751,783, filed Dec. 29, 2000, now U.S. Pat. No. 7,010,061.

Referring to FIG. 5, a Searcher object 413 provides a software object for controlling a searcher kernel. In a typical embodiment, a Searcher object 413 is associated with a searcher kernel and thereby processes correlation results, performs peak detection, threshold comparison, and controls a multi-standard multi-dwell search engine.

Searcher object class 413 includes Searcher_new 515. When Searcher_new 515 is called by VMI 307, a number of processing steps are automatically performed for the user programmer in order to look for conflicts and to properly initialize resources for the underlying searcher kernel. Use of an object such as Searcher_new 515 is advantageous because it allows the programmer to request a Searcher kernel without painstaking hardware level programming, such as board and chip programming, and conflict management. The processing steps that are performed for the programmer by Searcher_new 515 in one embodiment in accordance with the present invention are illustrated in FIG. 12.

Figure 12:
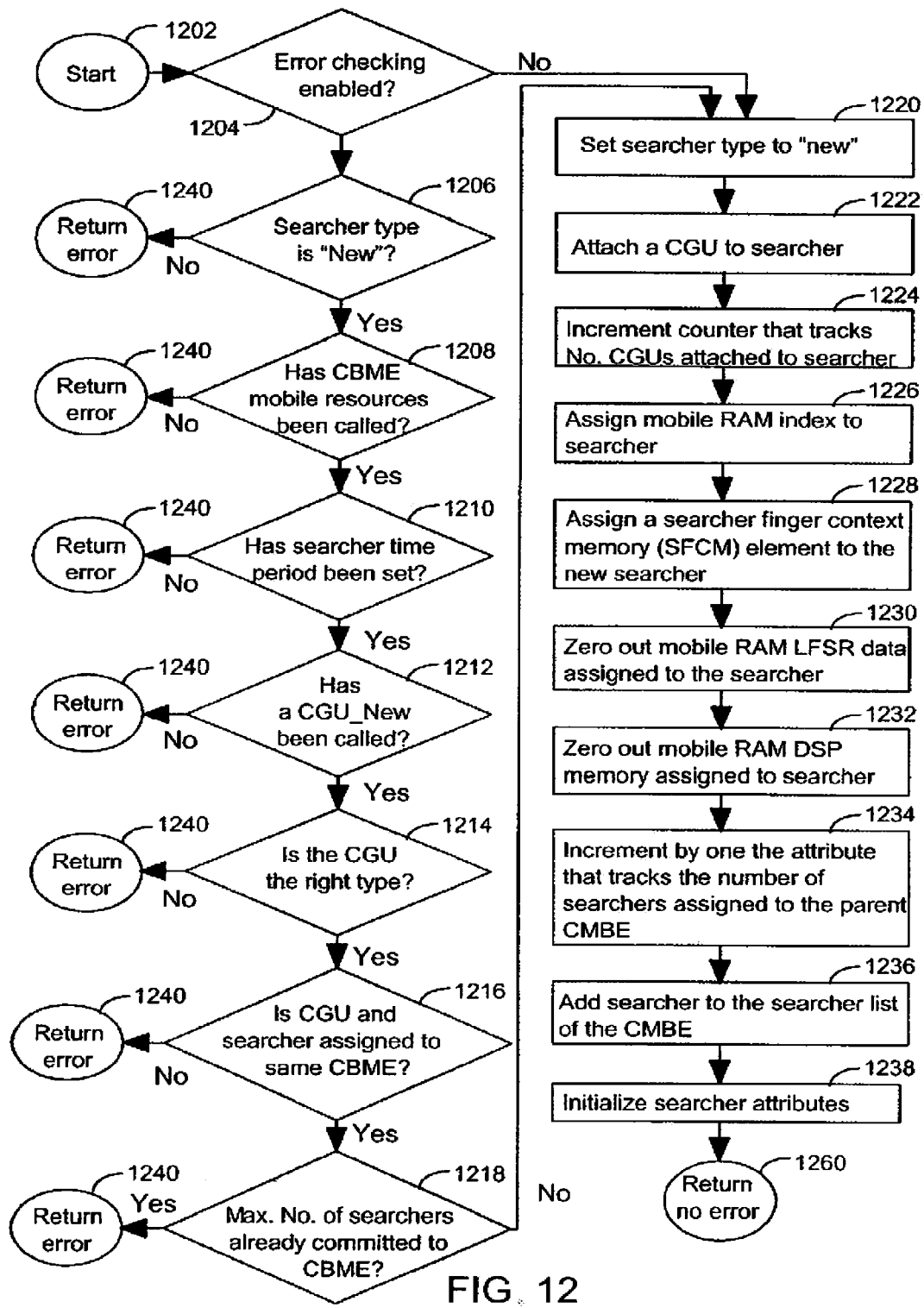
FIG. 12 is a flowchart illustrating the processing steps associated with a Searcher_new object in accordance with one embodiment of the present invention.

Turning attention to FIG. 12, the processing steps performed by one embodiment of Searcher_new 515 begin with processing step 1202. In processing step 1202, a particular searcher object 413 is identified. All subsequent processing steps either check to determine whether attributes of the searcher 413 identified in step 1202 are in the appropriate state and/or set particular attributes of the searcher 413 identified in processing step 1202.

In processing step 1204, a check is made to see if error checking is enabled. If error checking is enabled (1204—Yes) then a number of checks are performed. It will be appreciated that the order of many of the checks that are performed is not important. Additionally, one of skill in the art will appreciate that several additional checks that are not disclosed in FIG. 12 could be performed and all such checks are within the scope of the preset invention.

In a first check, a determination is made as to whether the searcher 413 that has been obtained by a call to Searcher_new 515 is of the right type. In some embodiments of the present invention, there are two types of searchers, those that are dedicated to finding new mobiles and those that are dedicated to existing mobiles. If the searcher 413 that has been obtained by a call to Searcher_new 515 is not dedicated to finding new mobiles (1240—No) the process ends with return error 1240. If the searcher 413 is dedicated to finding new mobiles (1206—Yes) then check 1208 is performed. In processing step 1208, a check is performed to see whether a function call has been made to a routine that sets cellular basestation modem engine (CBME) mobile resources. If the routine has not been called (1208—No), CBME 401 (FIG. 4) is not in the appropriate state and the process ends with return error 1240. If the routine has been called (1208—Yes) check 1210 is performed. In check 1210, a determination is made as to whether the time period for the searcher 413 identified in processing step 1202 has been set. Check 1210 returns an error if the time period for the searcher 413 has not been set (1210—No) and the process ends with error condition 1240. If a time period has been set for the searcher 413, the process continues with check 1212.

In processing step 1212, a check is made to determine whether the function CGU_new has been called. CGU_new 509 allocates a new CGU kernel. Illustrative CGU kernels in accordance with one embodiment of the present invention are disclosed in "A Configurable Code Generator System for spread spectrum applications," U.S. patent application Ser. No. 09/751,782, filed Dec. 29, 2000, now U.S. Pat. No. 6,567,017. If CGU_new 509 has not called (1212—No), the process ends with return error 1240. If a CGU new 509 has been called (1212—Yes), a determination 1214 is made as to whether the CGU kernel fetched by CGU_new 509 is the right type. In one embodiment of the present invention there are four types of CGU kernels, a searcher CGU, an uplink CGU, a Preamble Detection Engine (PDE) Antenna CGU, and a downlink CGU. Check 1214 will return an error (1214—No; 1240) if the CGU type for Searcher 413 is any type other than a Searcher CGU.

If the CGU kernel called by CGU_new 509 is a valid type (1214—Yes), check 1216 is performed to determine whether the CGU fetched by CGU_new 509 and the Searcher are assigned to the same CBME 401 (FIG. 4). If the CGU and the searcher are not assigned to the same CBME 401 (1240—No) the process ends with error 1240. If the CGU and the searcher are assigned to the same CBME (1240—Yes), the process continues with check 1218. In check 1218, a determination is made as to whether the maximum number of Searchers have already been committed to CBME 401. If the maximum number of Searchers have already been committed to CBME 401 (1218—Yes), then Searcher_new 515 will fail and the process ends with error code 1240. If the maximum number of Searchers have not already been committed to CBME 401 (1218—No) the process continues with processing steps 1220 through 1238, which are designed to initialize Searcher 413 and the associated Searcher kernel to the proper state. Although FIG. 12 refers to each error code as error 1240, one of skill in the art will appreciate that each error code 1240 could in fact be a unique error code. For example, a different return value for Searcher_new 515 could be assigned for each different type of error encountered during processing steps 1206 through 1218.

Attention now turns to processing steps 1220 through 1238 in FIG. 12. Processing step 1220 is reached if all error checks are performed satisfactorily (1218—No) or if error checking is disabled (1204—No). In processing step 1220, the searcher type of the searcher is designated as "NEW." In one embodiment of the present invention, VMI 307 flags Searcher 413 as new using illustrative code line 101.

(101) p_searcher→searcher_type=M_New_Mobile_Searcher;

In illustrative code line 101, "p_searcher" is a pointer to the Searcher 413 identified in processing step 1202 (FIG. 12). "Searcher_type" is the attribute of "p_searcher" that tracks the type of "p_searcher." By assigning the attribute "searcher_type" to "M_New_Mobile_Searcher," "p_searcher" is committed to type NEW. In processing step 1222, a CGU is attached to Searcher 413. In processing step 1224 an attribute that tracks the number of CGUs that have been attached to the searcher is incremented by "1". In one embodiment in accordance with the present invention, this attribute is associated with the pointer to the CGU that has been associated with p_searcher and the increment is performed using illustrative code line 102.

(102) ++p_cgu→attach_count;

In illustrative code line 102, p_cgu is a pointer to the CGU 507 that has been attached to p_searcher, p_searcher is the Searcher 413 identified in processing step 1202. In processing step 1226, a mobile RAM index is assigned to Searcher 413. In processing step 1228, a searcher finger context memory (SFCM) element is assigned to Searcher 413. The SFCM element controls the scheduling and attributes of Searcher 413 such as the search window size of the code offset, dwell state number, a phase count for searches greater than ½ chip resolution, and a control flag that is used to start and stop Searcher 413. One of skill in the art will appreciate that any number of SFCM element data structures and schemes are possible for controlling Searcher 413 and the associated Searcher kernel and all such data structures and schemes are within the scope of the present invention.

In processing step 1230, the mobile random access memory (RAM) linear feedback shift register (LFSR) associated with Searcher 413 is zeroed out. In processing step 1232, the mobile RAM DSP memory is zeroed. In processing step 1234, the attribute that tracks the number of searchers assigned to CBME 401 is incremented by "1". In processing step 1236, Searcher 413 is added to the searcher list of CBME 401 using the SFCM element assigned to Searcher 413 as an index. In one embodiment, processing step 1236 is performed using illustrative code line 103.

(103) p_cbme→p_searcher_list[p_searcher→ p_sfcm_data→sfcm_index]=p_searcher;

In illustrative code line 103, "p_cbme" represents the CBME 401 (FIG. 4) to which p_searcher is associated. Further, "p_searcher_list" is the list of searchers that are associated with CBME 401. This list is indexed by the SFCM element assigned to Searcher 413 by querying the value of "p_searcher→p_sfcm_data→sfcm_index." In processing step 1238 various searcher attributes are initialized. In one embodiment, processing step 1238 is performed using illustrative code lines 104 through 109.

```
(104) p_searcher->p_sfcm_data->p_searcher = p_searcher;
(105) p_searcher->p_sfcm_data->active = M_FALSE;
(106) p_searcher->pdp_read = M_TRUE;
(107) p_searcher->new_searcher_called = M_TRUE;
(108) p_searcher->p_cbme = p_cbme;
(109) p_searcher->state = M_SEARCHER_STOPPED;
```

In illustrative code line 104, the SFCM element that tracks the identity of Searcher 413 is assigned the value of pointer "p_searcher." "P_searcher" is the pointer to Searcher 413 that was identified in processing step 1202 (FIG. 12). In illustrative code line 105, the attribute "active" is set to M_FALSE. When attribute "active" is set to M_FALSE, virtual machine 309 (FIG. 3) is directed not to search or store data for "p_searcher." In illustrative code line 106, the attribute "pdp_read" is set to M_TRUE. The power delay profile (PDP) is a data structure that stores the search results of "p_searcher." Setting "pdp_read" to M_TRUE indicates that the most recent searcher results have been read by an application program 301 (FIG. 3). This is appropriate during searcher initialization because "p_searcher" has in fact never stored search results to the PDP. When "p_searcher" performs a search at a later time, VMI 307 will set the attribute pdp_read to "M_FALSE" until application program 301 reads the PDP associated with "p_searcher."

In illustrative code line 107, the attribute "new_searcher_called" is set to "M_TRUE." This attribute is used to indicate that Searcher_new 515 has been properly called for "p_searcher." In illustrative code line 108, "p_searcher" is associated with CBME 401. Finally, in illustrative code line 109, the attribute "state" is set to "M_SEARCHER_STOPPED" to indicate that the searcher kernel associated with "p_searcher" is not currently in search mode. In processing step 1260, Searcher_New ends with an error free return to the calling program.

Review of the flowchart in FIG. 12 reveals a number of advantages of VMI 307. The VMI 307 programmer can use VMI 307 to request a Searcher 413 and associated Searcher kernels without need, for instance, to resolve complex hardware conflicts and board level programming.

Returning attention to FIG. 5, Searcher 413 further includes functions such as Set_searcher_static_attributes 517, Set_searcher_dynamic_attributes 519, Searcher_start 521, Searcher_stop 523, and Assign_DSM_to_searcher 525. Set_searcher_static_attributes 517 is used to set searcher static attributes such as system parameters, antenna data port, and despread mode. The function Set_searcher_dynamic_attributes 519 is used to set searcher dynamic attributes such as channel type and number. Searcher_start 521 is used to start a Searcher 413. Searcher_stop 523 is used to stop a Searcher 413. Assign_DSM_to_searcher 525 is used to assign a searcher DSM to a Searcher 413.

Searcher Dwell State Machine 421

Each Searcher 413 must be assigned to a dwell state machine (DSM). A DSM is used to configure the Searcher algorithm. Searcher_DSM 421 includes Searcher_DSM_new 529 and Set_DSM_state_attributes 531. Searcher_DSM_new 529 is invoked to allocate a new DSM and Set_DSM_state_attributes 531 is used to set the integration length and threshold for a specific state of a searcher_DSM. Functionally, a searcher VMI object 413 is used to control the corresponding searcher kernel hardware for mobile channels, and a searcher_DSM 421 is used to configure the searcher algorithms. Further details of the searcher hardware kernel are found in U.S. patent application Ser. No. 09/751,777, filed Dec. 29, 2000, now U.S. Pat. No. 7,031,376.

A searcher PDP (power delay profile) is a data type used to store results returned from the searcher. In one embodiment of the invention, each searcher has one DSM and one PDP.

Preamble Detection Engine 533

A Preamble Detection Engine (PDE) kernel detects the presence of access bursts from new mobiles. A PDE is associated with one or more antennas. An access burst signal is used by a mobile to attempt access to a basestation, its time of transmission is random. In the methods of the present invention, a PDE object 533 is associated with a PDE kernel. The PDE object class 533 includes PDE_new 535, for allocating a new PDE, as well as PDE_add_antenna 537, for adding an antenna to a PDE 533.

Finger 417

A finger kernel is a component of a RAKE receiver kernel. Each finger kernel of the RAKE receiver kernel is used to track an individual multipath signal over time. Multipath signals are caused when the signal emitted from a transmitter "bounces" off an object and arrives at the receiver through an alternate, delayed path. In a typical environment, multipaths are very dynamic in nature since a mobile is moving relative to reflecting objects. A RAKE receiver kernel is used to collect echoes (multipath signals), align them in time, then accumulate the energy to produce the best possible signal strength. Each finger locks onto and tracks a particular multipath signal and demodulates the data associated with the signal for later combining with other multipaths. In addition to the fundamental demodulation of the incoming multipath, each finger kernel is required to continually update an estimate of channel quality in order to test for a minimum level of quality across the channel. Further details of finger kernels that are associated with the finger object class 417 of the present invention may be found in U.S. patent application Ser. No. 09/772,584, now abandoned.

A finger object 417 is used to control the corresponding finger kernel. In one embodiment of the present invention, each finger kernel used is associated with a different Finger object 417 using an association process such as the one described below in conjunction with FIG. 11. The fingers can be combined using combiner object 411, or can remain independent. Finger object class 417 includes Finger_new 541. Finger_new 541 is invoked to allocate a new finger.

Figure 11:
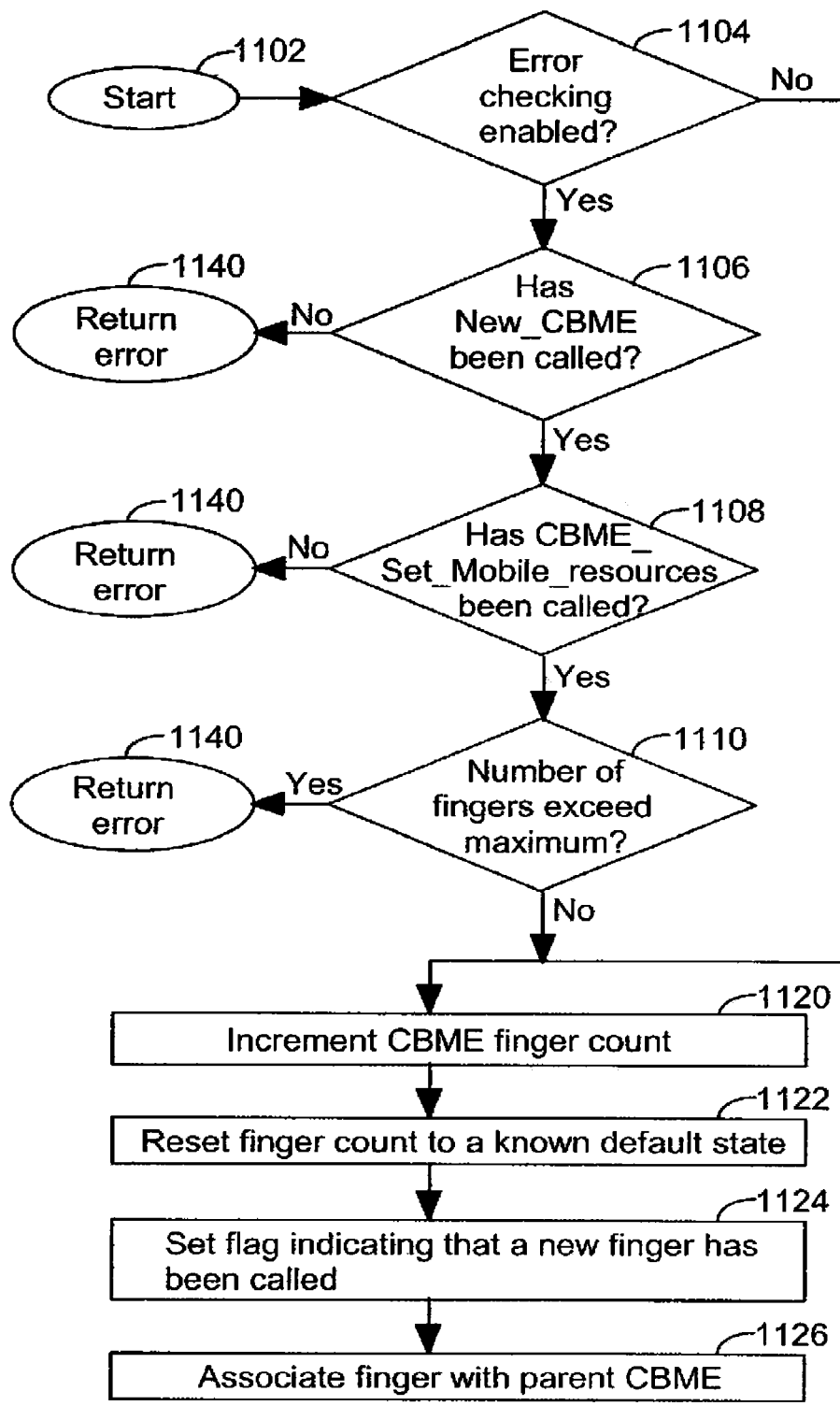
FIG. 11 is a flowchart illustrating the processing steps associated with a Finger_new object in accordance with one embodiment of the present invention.

When Finger_new 541 is called by a VMI application, a number of processing steps are performed by VMI 307. FIG. 11 is a flowchart that illustrates one embodiment of Finger_new 541 in accordance with the present invention. The process begins at start 1102. In processing step 1104 a query is made as to whether error checking is to be performed. If error checking is to be performed (1104—Yes), a number of checks are performed before associating a new finger with a CBME.

In check 1106, VMI 307 determines whether an instance of CBME_new 503 has been called. The purpose of CBME_new 503 is to create a CDMA basestation modem engine object 401. Thus, by barring allocation of a finger unless CBME_new has been called (1106—No; 1140), check 1106 insures that fingers are not allocated to a nonexistent CDMA basestation modem engine object 401.

In check 1108, VMI 307 determines whether CBME_set_mobile_resources has been called. CBME_set_mobile_resources configures the CDMA basestation modem engine object 401 for (a) the number of mobiles that can be supported and (b) the tracking finger block size for each mobile. CBME_set_mobile_resources is called by VMI 307 after calling CBME_get_resource_attributes, which returns the maximum number of fingers (max_fingers) that may be associated with the CBME as well as the maximum number of tracking fingers supported by the CBME at its input clock rate. Using max_fingers, a determination can be made, based on system requirements, on how many mobiles to support, and for each mobile, what will be the initial number of tracking fingers available to it. By barring allocation of a finger unless CBME_set_mobile_resources been called (1108—No; 1140), check 1108 insures that fingers are not allocated to a CDMA basestation modem engine object that has not been properly initialized.

Once CBME_set_mobile_resources and CBME_get_resource_attributes have been called, the CBME is properly initialized. Therefore, the maximum number of fingers that may be associated with the CBME is determined. Check 1110 insures that this maximum is not exceeded. If a request is made to associate a finger to a CBME that already has the maximum number of fingers associated with it (1110—Yes), an error code 1140 is returned.

If error checking is disabled (1104—No) or all error checks are satisfied (1106—Yes; 1108—Yes; 1110—No), then normal processing steps 1120 through 1126 are performed by Finger_new 541. In processing step 1120, the CBME finger count is incremented. The CBME finger count tracks the number of fingers that have been associated with the CBME. In processing step 1122, the finger that is to be associated with the CBME ("parent CBME") is set a known default state. In one embodiment, processing step 1122 resets the state of the finger in accordance with lines (201) through (206) of the following exemplary code.

```
(201) memset(p_finger, 0x00, sizeof(FINGER) );
(202) p_finger->legal_static_attrib = M_FALSE;
(203) p_finger->toa_delay_valid = M_FALSE;
(204) p_finger->state = M_FINGER_STOPPED;
(205) p_finger->p_comb = NULL;
(206) p_finger->new_finger_called = M_FALSE;
```

In lines (201) through (206) of the exemplary code, p_finger represents the finger that will ultimately be associated with the parent CBME in processing step 1126 (FIG. 11). In line (201) of the exemplary code, the entire finger kernel is zeroed. In line (202) of the exemplary code, the attribute "legal_static_attrib" is set to indicate that the finger kernel does not yet have a legal set of static or dynamic attribute data. In line (203) of the exemplary code, the attribute "toa_delay_valid" is set to "M_FALSE" to indicate that the finger kernel does not have a valid time of arrival delay. In line (204) of the exemplary code, the attribute "state" is set to "M_FINGER_STOPPED" to indicate that the finger kernel is not running. In line (205) of the exemplary code, the attribute "p_comb" is set to "NULL" to indicate that the finger object 417 has not been added to a combiner. Finally, in line (206) of the exemplary code, the attribute "new_finger_called" is set to "M_FALSE" to indicate that a new finger has not been called.

In processing step 1124, the attribute "new_finger_called" is set to "M_TRUE" to indicate that a new finger has been called. Finally, in processing step 1126, the finger object 417 is associated with a parent CBME. In one embodiment, processing step 1126 is performed by setting an attribute termed "p_cbme" to the address of the parent p_cbme. Such a command could be performed using line (207) of the exemplary code.

(207) p_finger→p_cbme=p_cbme;

Exemplary code line (207) causes finger object 417 to become associated with CBME object 401. At the hardware level, exemplary code line 207 causes the finger kernel associated with p_finger (Finger 417) to become associated with the combiner kernel associated with p_cbme (CBME 401).

Returning attention to FIG. 5, the Finger object class 417 further includes Finger_set_static_attributes 543, Finger_set_dynamic attributes 545, Finger_start 547, and Finger_stop 549. Set_finger_static_attributes 543 as well as the VMI object Set_finger_dynamic_attributes 545 are used to set static and dynamic attributes for a finger, respectively. Finger_start 547 and Finger_stop 549 are used to start and stop a finger object 417, respectively.

Combiner 411

A combiner kernel combines the outputs of one or more finger kernels and sums them in accordance with a combining rule. In some embodiments, a combiner kernel is associated with one to sixteen finger kernels. In one embodiment of the present invention, each finger kernel is assumed to track a single multi-path and a set of finger kernels are set up for combining using VMI 307 (FIG. 3).

After time alignment of each stream, the outputs of the set of finger kernels are combined by arithmetically summing the outputs. In non-coherent IS-95 mode, for example, a combination operation such as a Hadamard Transform results in arithmetic summation of the outputs before entry into a soft decision device. In coherent-mode, each finger kernel provides an estimate of instantaneous channel energy and each is selected for combining based on a sufficiently large SIR. In one embodiment, the largest and smallest instantaneous estimate is recorded for each finger kernel over a window of size K. The finger kernel is selected for combining if the following condition is true:

$$\overline{S}_1(k) \geq \max\{S_{min}(k) \cdot 10^{0.1\Delta_{noise}}, S_{max}(k) \cdot 10^{-0.1\Delta_{rake}}\}$$

where,

"S over-bar" is the energy estimate and $\Delta_{noise}$ and $\Delta_{rake}$ are design parameters.

Combiner objects 411 are used to combine the outputs of one or more fingers based on a combining rule. Thus, a combiner object can be associated with 1 to N fingers. The Combiner object class 411 includes Combiner_new 553, which is used to allocate a new combiner for a CBME 401. The Combiner object class 411 also includes Add_finger_to_combiner 555 and Remove_finger_from_combiner 557 which are respectively used to add a finger 417 to or remove a finger 417 from a Combiner object 411. The Combiner object class 411 also includes Combiner_start 559 and Combiner_stop 561, which are respectively used to start and stop a Combiner object 411.

Uplink 403 and Downlink 567

In CDMA, logical channels include the control and traffic channels. The traffic channels are used to carry user information, along with signaling traffic, between the basestation and the mobile station. The control channels comprise downlink channels and uplink channels. Accordingly, VMI 307 provides an uplink object 403 and a downlink object 567.

Uplink object 403 is used to group Combiners 411 along with their respective attached Fingers 417 as well as Searchers 413 that are common to a mobile uplink. Typically, Combiners 411 and Searchers 413 are added to an Uplink. In some embodiments of VMI 307, there is no limit to the number of Uplink objects 403 that can be declared. Uplink object class 403 includes Uplink_new 565, which is used to allocate a new uplink. Downlink object class 567 includes Downlink_new 569, which is used to allocate a new downlink.

Tx Multicode Channel 571

Transmit multicode channel object 571 includes MTX_new 573. MTX_new 573 is used to allocate a Transmitter channel.

Static Versus Dynamic Attributes

In some embodiments, objects Set_searcher_static_attributes 517 and Set_finger_static_attributes 543 are called to set static attributes when the underlying hardware is not running or is off-line. For example, static attributes of a searcher object may be set by calling Set_searcher_static_attributes 517 upon a power-up or reboot of the system or if the pertinent objects are not running. On the other hand, objects Set_finger_dynamic_attributes 545 and Set_searcher_dynamic_attributes 519 are called regardless of whether the underlying hardware is running or not, allowing the dynamic attributes to be set "on the fly."

Additional VMI 307 Objects

In addition to the VMI objects illustrated in FIG. 5, VMI 307 includes additional software objects such as a matched filter. The matched filter VMI object is used to control the corresponding matched filter kernel. The matched filter is a faster version of a searcher kernel, but the matched filter kernel is not as configurable as the searcher kernel. In one embodiment of the invention, the matched filter is used when the underlying reconfigurable wireless network communication apparatus 311 (FIG. 3) is configured for 3GPP mode. In another embodiment of the present invention, a matched filter may be used in either a multi-standard CDMA traffic channel receiver or a RACH-type receiver (3GPP) and both coherent and noncoherent accumulation modes are allowed.

Although certain methods and objects have been described with respect to FIG. 5, it will be apparent to one skilled in the art that other objects and methods may be defined and used as appropriate in conjunction with the invention. Further, some objects may be combined or divided. For example, the searcher and finger objects may be combined to form a single object. In another embodiment, the searcher and finger may be further divided into multiple objects.

The VMI of the present invention is designed to synchronize respective hardware kernels with corresponding software objects so that a manipulation of VMI objects within the VMI causes an analogous change in the hardware. To this end, each software object has one or more corresponding hardware components in the underlying hardware CBME. For example, CBME 401 corresponds to and controls a CBME (CDMA BTS engine). Uplink 403 corresponds to and controls the uplink hardware components and searcher 413 corresponds to and controls a hardware searcher in the CBME.

Thus, in one embodiment, there is at least one hardware module for each VMI software object. In alternate embodiments of the invention, there may be a many-to-one correspondence between software objects and the counterpart hardware kernel. This is possible when one hardware kernel is configured to support multiple counterpart software objects in a time-sliced fashion. For example, one hardware searcher kernel may support many software searcher objects if the latter can be serviced by the hardware kernel in a time multiplexed fashion. In still other embodiments, there may be a many-to-one correspondence between hardware kernels and a VMI software object.

Figure 6:
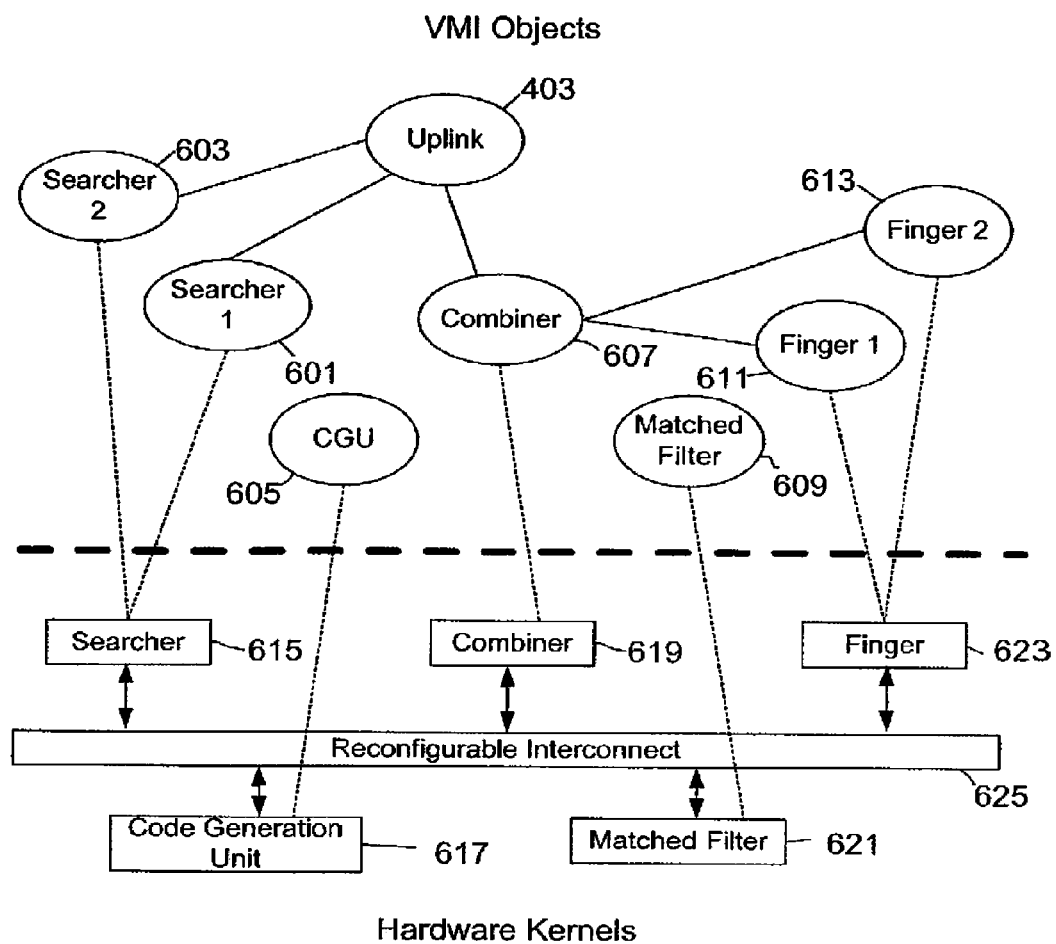
FIG. 6 illustrates the association between VMI software objects and hardware kernels in accordance with one embodiment of the invention.

FIG. 6 illustrates the relationship between software objects and counterpart hardware kernels in accordance with one aspect of the present invention. In the example shown in FIG. 6, the programmer instantiates the following objects from the VMI library: searcher1 601, searcher2 603, CGU 605, combiner 607, matched filter 609, "finger1" 611, and "finger2" 613 in order to enable a particular communication protocol. In response to the user's instantiation of the objects, the hardware configures the following kernels: searcher 615, CGU 617, combiner 619, matched filter 621, and finger 623. Once the software objects are instantiated and the hardware kernels are configured, the user can manipulate the software objects through various functions in order to control and coordinate the functions of the corresponding hardware kernels.

As FIG. 6 illustrates, there is a hierarchical relationship among VMI objects in one embodiment of the present invention. On the hardware side, hardware kernels, 615, 617, 619, 621 and 623 are coupled to each other via a reconfigurable interconnect 625. As FIG. 6 illustrates, there is at least one hardware kernel for each instantiated object in the VMI in some embodiments of the present invention. For example, the CGU 605, combiner 607, and matched filter 609 are each supported by hardware counterparts: CGU 617, combiner 619 and matched filter 621. However, it is also possible for one hardware kernel to support a plurality of VMI objects. For example, in FIG. 6, searcher objects 601 and 603 are supported by a single searcher kernel 615. Such single-kernel-to-multiple-object correspondence is possible if searcher objects 601 and 603 can be serviced by the single searcher kernel 615 in a time multiplexed fashion.

As discussed above, the VMI objects illustrated in FIG. 6 are designed to synchronize the corresponding hardware kernels so that a manipulation of the VMI objects causes an analogous change in the hardware components. For example, if the user changes a parameter in a searcher object 601, for instance the sub-chip resolution value of the searcher object 601, that change will be reflected in the corresponding hardware kernel 615 within the appropriate time interval.

Although a searcher, finger, combiner, code generation unit and matched filter are shown in FIG. 6, it will be appreciated by one skilled in the art that as many hardware kernels and corresponding software objects may be created and utilized according to the needs and requirements of a particular communication system as may be permitted by the available resources. Various VMI objects can be instantiated, parameterized and reconfigured to accommodate and adapt to the unique requirements of various communication protocols. For example, when a CDMA protocol is used, a MPSK (multiple phase shift keying) demodulator object, a convolutional decoder object, and a rake receiver object are instantiated and parameterized to configure the corresponding hardware modules. On the other hand, when a TDMA protocol is used, an MPSK demodulator object, a convolutional decoder object, and an MLSE equalization object are instantiated and parameterized according to TDMA system specifications.

Figure 7A:
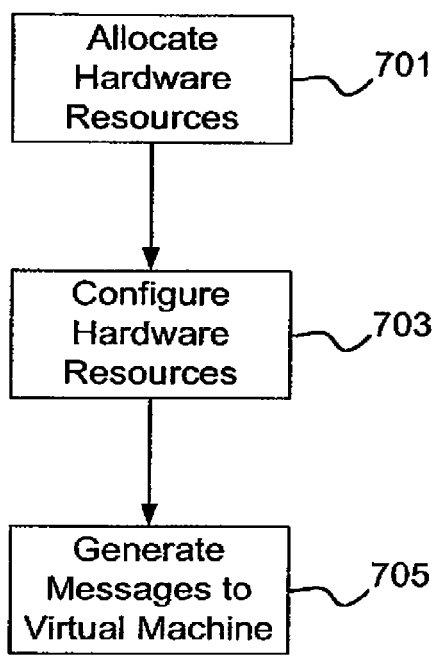
FIG. 7(A) is a flowchart illustrating the processing steps of one embodiment of a VMI software object in accordance with the invention.

FIG. 7(A) is a flowchart illustrating one embodiment of a VMI software object in accordance with the invention. In step 701, an object, for example a searcher object, allocates hardware resources of the reconfigurable wireless network communication apparatus 311 for implementing a searcher hardware kernel(s). In step 701, hardware memory resources and processing resources are secured and allocated to implement a searcher. In step 703, the object configures hardware resources allocated in step 701 to perform a function such as a searcher function. In step 705, the VMI software object generates and communicates messages to virtual machine 309 that incorporate information regarding allocation and configuration of the hardware resources performed in steps 701 and 703. The information regarding the allocation and configuration can be translated by the virtual machine 309 into machine-readable instructions and relayed to the reconfigurable wireless network communication apparatus 311.

After the resource allocation and configuration are performed in steps 701 and 703, the actual allocation and configuration of the hardware resources are performed by the resource allocator of the reconfigurable wireless network communication apparatus 311, based on the machine-readable instructions provided by the virtual machine 309.

Figure 7B:
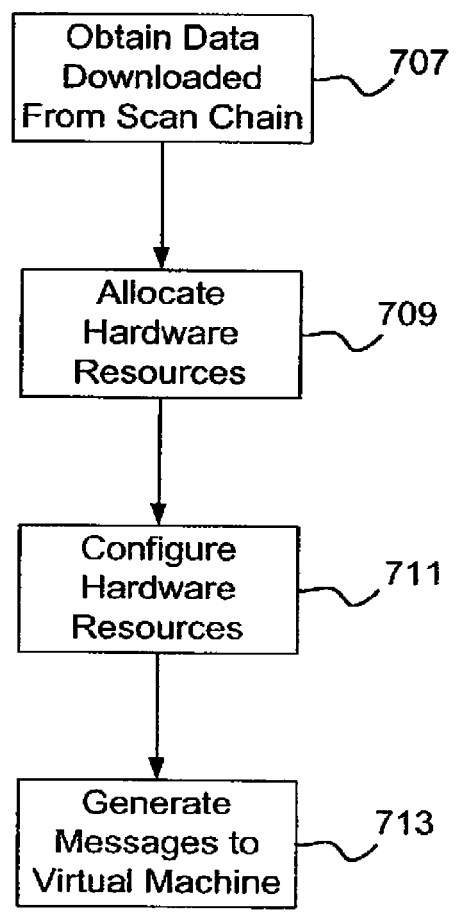
FIG. 7(B) is a flowchart illustrating the processing steps of an alternate embodiment of a VMI software object in accordance with the invention.

FIG. 7(B) is a flowchart illustrating an alternate embodiment of a VMI software object in accordance with the invention. The flowchart in FIG. 7(B) represents a VMI software object that is protocol-dependent, i.e., one that requires protocol-specific information. The steps performed in FIG. 7(B) are similar to the steps in FIG. 7(A) except for step 707. In step 707, the software object obtains protocol-specific information downloaded via a scan chain. The protocol-specific information is used to initialize the state of the reconfigurable wireless network communication apparatus 311. For example, a transmitter VMI object needs information as to what type of communication protocol is desired. In one case, if a CDMA protocol is used, the transmitter VMI object obtains relevant information in step 707 in order to allocate and configure hardware resources in steps 709 and 711. In step 713, the VMI object generates and communicates messages to virtual machine 309 that incorporate information regarding allocation and configuration of the hardware resources performed in steps 709 and 711. The information regarding the allocation and configuration can then be translated by the virtual machine 309 into machine-readable instructions and relayed to the reconfigurable wireless network communication apparatus 311.

Figure 8:
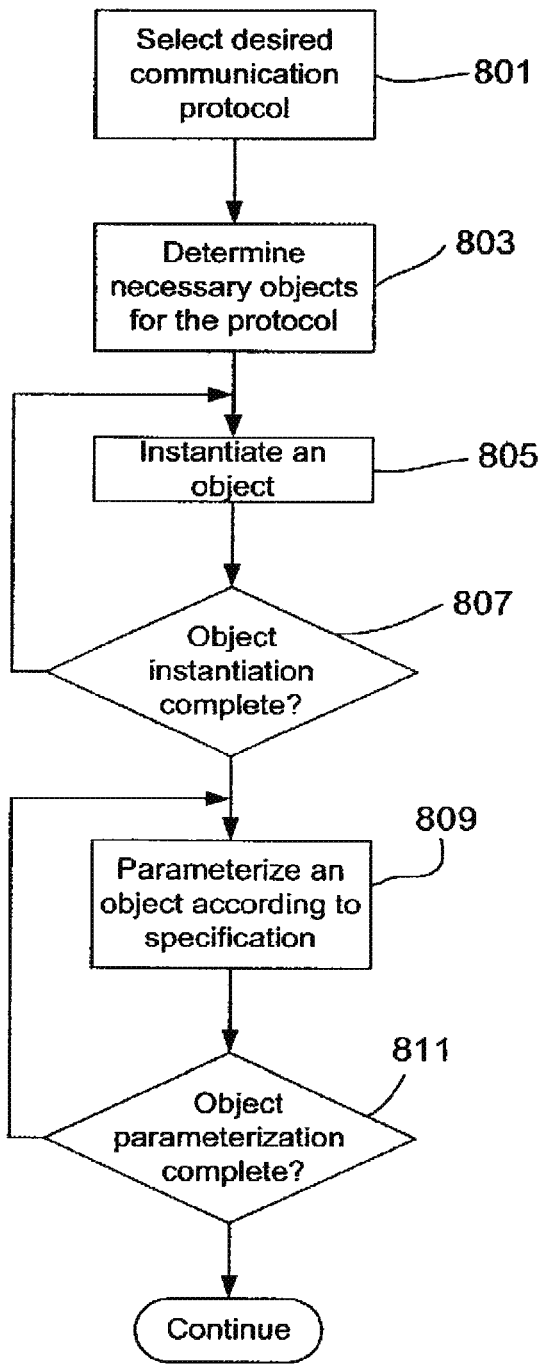
FIG. 8 is a flowchart illustrating the instantiation and parameterization of various objects of the VMI to accommodate the system requirements of a communication protocol.

FIG. 8 is a flowchart illustrating the instantiation and parameterization of various objects of the VMI to accommodate the system requirements of a communication protocol. In step 801, a program selects a communication protocol. Alternatively, an initialization of the system may be performed prior to step 801. Different embodiments may be used to initialize the system. In a preferred embodiment, a scan chain technique is used to download initialization information into the reconfigurable wireless network communication apparatus. For example, if a CDMA communication protocol is used, CDMA-related data and parameters are downloaded into the memory of the reconfigurable wireless network communication apparatus 311 or into any memory device that the software virtual machine interface 307 can access. The scan chain technique is well-known in the art, and not described in detail so as not to obscure important aspects of the present invention.

In step 803, the programmer determines what objects to instantiate and use for the protocol determined in step 801. In step 805, the programmer instantiates an object, and continues until all necessary objects have been instantiated. In step 809, the programmer parameterizes each object instantiated according to the system specification of the protocol. When the parameterization is complete in step 811, the programmer continues to the next task.

Alternatively, the programmer may combine instantiation and parameterization in step 805. In other words, the programmer may instantiate and parameterize each object in step 805, instead of performing a separate parameterization step in 809. Thus, the present invention provides the ability to instantiate different VMI objects in steps 805 through 807 and to give different parameters to the instantiated objects in steps 809 through 811 in order to accommodate different protocols. Once instantiated, VMI objects control and coordinate functions of the corresponding hardware kernels in order to perform a given task. Reconfiguration and parameterization of corresponding hardware kernels are described in U.S. patent application Ser. No. 09/772,584, now abandoned.

Figure 9:
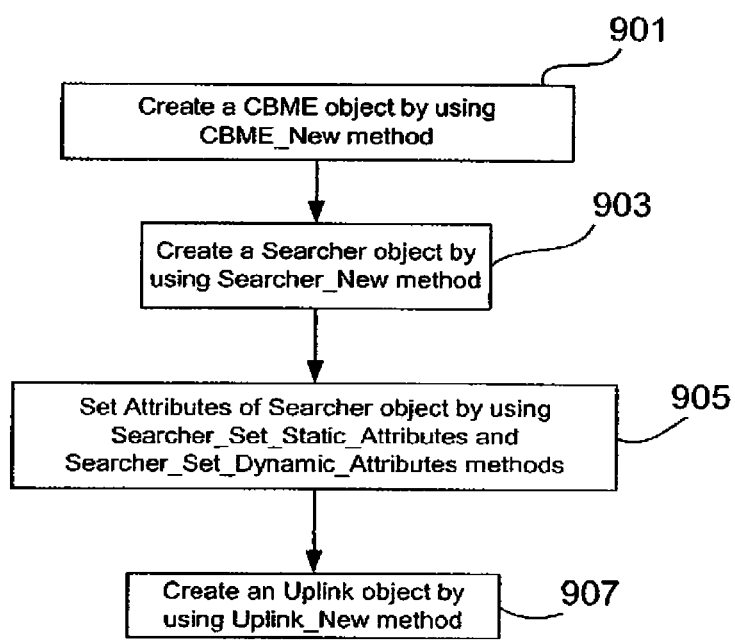
FIG. 9 is an example of an object instantiation and parameterization routine performed by steps 703-713 of FIG. 7.

FIG. 9 is an example of an object instantiation and parameterization routine performed by steps 803-811. One or more CBME objects can be instantiated, provided there is one physical CBME hardware counterpart for every software CBME object. A CBME object is created in step 901 by calling object CBME_new 503. Then a new searcher object is created in step 903 by object Searcher_new 515. In step 905, the new searcher is parameterized by setting its static and dynamic attributes with object Set_searcher_static_attributes 517 as well as Set_searcher_dynamic_attributes 519. In step 907, an uplink object is created by calling object Uplink_new 565. It will be apparent to one skilled in the art that other objects may be instantiated and parameterized in a similar fashion.

Figure 10:
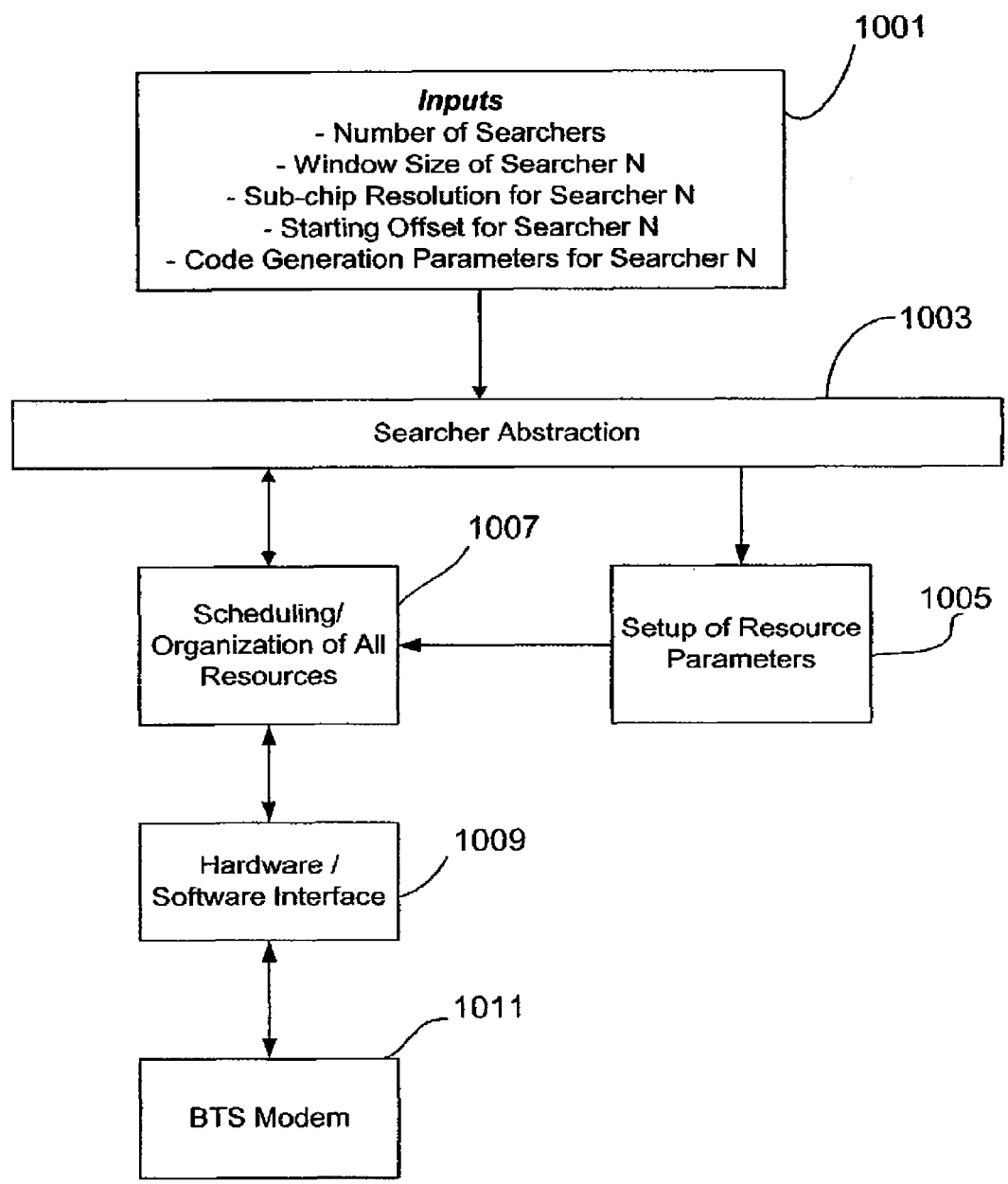
FIG. 10 is an example of a searcher VMI object receiving various parameters to optimize a search pattern with controlled search throughput.

FIG. 10 is an example of a VMI searcher object 413 receiving various parameters to optimize a search pattern with controlled search throughput. In FIG. 10, the programmer specifies the following parameters: the number of searchers, window size of searchers, sub-chip resolution for searchers, starting offset for searchers, and code generation parameters (1001). The system may construct a single fast searcher, many slower searchers, or any combination thereof. Block 1003 illustrates an abstraction of a searcher object.

In one embodiment of the invention, a searcher can be optimized in different ways. For example, in order to minimize dropped phone calls in a wireless terminal application, a programmer may decide to allocate the majority of search resources to detecting new multi-paths for existing calls at the expense of detecting new calls. The present invention allows such dynamic reallocation of search resources and parameterization at 1005 and 1007, performed by a searcher VMI object. For example, at a peak number of callers, the searchers can be prioritized for minimum dropped calls whereas at a lower number of callers, the searchers can be prioritized to minimize the detection time of new callers.

In the embodiment shown in FIG. 10, blocks 1003 through 1009 are implemented by a VMI searcher object 413. Hardware/software interface 1009 provides an interface between the VMI searcher object 413 and BTS modem 1011.

Now that the basic operation of various VMI 307 objects has been described, a detailed example of an Application program 301 will be described to further illustrate the advantages of the present invention. In this example, a CBME 401 is created, a searcher 413 is created and associated with the CBME and then the searcher is started.

```
(301) void DFS_Pre_Simulation_Hook(void)
(302) {
(303) UINT16 i;
(304) UINT16 fcount, scount;
(305) UINT16 cgu_index = −1;
(306) UINT16 stat = 0;
(307) UINT16 delay = 0;
(308) UINT16 fractional_delay = 0;
(309) UINT16 cgu_counter = 0;
(310) /* open the PDP output file */
(311) p_pdp_file = fopen(pdp_filename, "w"); .
(312) /* first set up a CBME */
(313) p_cbme = malloc(sizeof(CBME));
(314) stat |= CBME_new(p_cbme, DEFAULT_CBME_ADDR, M_MERGE_INT);
(315) stat |=    CBME_Set_Mobile_Resources(p_cbme, VMI_FOUR_FING_BLK,
(316)                  VMI_SIXTY_FOUR_MOBS);
(317) /* perform CBME self test 0, not effect for now... */
(318) stat |= CBME_Perform_Self_Tests(p_cbme, VMI_TEST0); /** VMI call **/
(319) /* set up a CGU for the uplink */
(320) stat |= CBME_Get_CGU_List(p_cbme, &cgu_list);
(321) for (i=0; i<cgu_list.num_on_chip_cgus; i++)
(322)     {
(323)         if(cgu_list.cgu_attributes[i].cgu_object_type == M_UPLINK_CGU) (
324)         {
(325)             cgu_index = cgu_list.cgu_attributes[i].cgu_index;
(326)         }
(327)     }
(328)     if (cgu_index == −1)
(329)     {
(330) fprintf(stderr, "error: Unable to find CGU type in CGU list\n.");
(331)     }
(332)     p_ul_cgu = malloc(sizeof(CGU));
(333)     stat |= CGU_new(p_cbme, p_ul_cgu,
(334)                  cgu_index, VMI_CGU_CODE_NUMBER);
(335)     /* set up an uplink */
(336)     p_ul = malloc(sizeof(UPLINK));
(337)     stat |= Uplink_New(p_cbme, p_ul, p_ul_cgu);
(338)     /* set up an combiner */
(339)     p_comb = malloc(sizeof(COMBINER));
(340)     stat |= Combiner_New(p_cbme, p_comb);
(341)     /* add combiner to the uplink */
(342)     stat |= Uplink_Add_Combiner(p_ul, p_comb);
(343)     /* set up 1 finger */
(344)     for (fcount = 0; fcount < num_fingers; fcount++)
(345)     {
(346)         p_fing = malloc(sizeof(FINGER));
(347)         stat |= Finger_New(p_cbme, p_fing);
(348) /* set up the finger in the combiner */
(349)         stat |= Finger_Set_Static_Attributes(p_fing, &fing_stat_attrib);
(350)         stat |= Finger_Set_Dynamic_Attributes(p_fing, &fing_dynamic_attrib);
(351)         stat |= Add_Finger_To_Combiner(p_comb, p_fing);
(352)     /* set finger position */
(353)         stat |= Finger_Set_Offset(p_fing,
(354)                 fing_offset[fcount], fing_frac_offset[fcount]);
(355)     }
(356)     stat |= Combiner_Start(p_comb);
(357)     assert(stat == 0);
(358)     /* set up a searcher */
(359)     stat |= CBME_Set_Searcher_Energy_Scaling(p_cbme,
(360)                 M_SEARCHER_SCALE_19_8);
(361)     stat |= CBME_Set_Search_Time_Period(p_cbme, TIMER_CONSTANT);
(362)     p_searcher = malloc(sizeof(SEARCHER));
(363)     stat |= Searcher_New(p_cbme, p_searcher,
(364)                 M_EXISTING_MOBILE_SEARCHER, NULL);
(365)     stat |= Searcher_Set_Existing_Mobile_Static_Attributes(p_searcher,
(366)                 &searcher_static_attrib);
(367)     assert(stat == 0);
(368)     /* set up a searcher DSM */
(369)     stat |= CBME_Set_DSM_Subchip_Phase(p_cbme, VMI_DSM_HP_LOW,
(370)                 VMI_DSM_HP_HIGH,
(371)                 VMI_DSM_1QP_LOW,
(372)                 VMI_DSM_1QP_HIGH,
(373)                 VMI_DSM_2QP_LOW,
(374)                 VMI_DSM_2QP_HIGH);
(375)     p_dsm = malloc(sizeof(SEARCHER_DSM));
(376)     stat |= Searcher_DSM_New(p_cbme, p_dsm,
(377)                 M_DSM_HALF_CHIP, num_dsm_states);
(378)     assert(stat == 0);
(379)     /* set up each state of the DSM */
(380)     for (scount = 0; scount < num_dsm_states; scount++)
```

-continued

```
(381)    {
(382)    stat |= Searcher_DSM_Set_State_Attributes(p_dsm,
(383)              scount, VMI_DSM_INT_LEN,
(384)              VMI_DSM_PDI_LEN,
(385)              VMI_DSM_THRESHOLD);
(386)              assert(stat == 0);
(387)    }
(388)    /* assign the DSM to the searcher */
(389)    stat |= Searcher_Assign_DSM(p_searcher, p_dsm);
(390)    assert(stat == 0);
(391)    /* add searcher to the uplink */
(392)    stat |= Uplink_Add_Searcher(p_ul, p_searcher); assert(stat = = 0);
(393)    /* start the searcher */
(394)    stat |= Searcher_Start(p_searcher);
(395)    assert(stat == 0);
(396) }  /* end DFS_Pre_Simulation */
```

Lines 301 through 396 will now be described in detail.

Step 1: (lines 301-311) In Step 1, the procedure "DFS_Pre_Simulation_Hook" is defined. This procedure will create a CBME 401 and start a searcher 413. Further, in lines 301 through 311, various variables that are used by the procedure are defined. Finally, a file for writing out a power delay profile (PDP) is opened.

Step 2: (lines 313-316) VMI 307 object CBME_new 503 is used create a CBME 401. The mobile resources for the newly created CBME 401 are defined using the VMI 307 object CBME_set_mobile_resources.

Step 3: (lines 317-318) The VMI 307 object CBME_Perform_Self_Tests is executed to test the newly created CBME 401.

Step 4: (lines 319-334) VMI 307 objects are used to obtain a code generation unit 507 for an uplink. First, the list of possible CGUs available is obtained. For each available CGU, a check is performed to insure that the CGU has the object type "M_UPLINK_CGU." When a CGU having this attribute is found, it is initialized and assigned to the newly created CBME 401 using the VMI 307 object CGU_new 509.

Step 5: (lines 335-337) An uplink 403 is associated with the newly created CBME 401 using VMI 307 object Uplink_new 565.

Step 6: (lines 338-342) A Combiner 411 is assigned to the newly created CBME 401 using the VMI 307 objects Combiner_new 553 and Uplink_Add_Combiner.

Step 7: (lines 343-357) VMI 307 objects Finger_New 541, Add_Finger_To_Combiner 555, and Finger_Set_Offset are buried in a loop so that "num_finger" fingers can be created, added to the newly created CBME 401 and set to an appropriate position. In one embodiment, the value of num_finger is set to "1" so that only one finger is added during step 7. Once the combiner has been appropriately populated with one or more fingers, the Combiner 411 is started with the VMI 307 command Combiner_start 559.

Step 8: (lines 358-367) A searcher is defined. First, the VMI 307 object CBME_Set_searcher_energy_scaling is run. Internally, CBME 401 generates a 32-bit search result value. However, in some embodiments of the present invention, only 12 bits are reported to the microprocessor. CBME_set_searcher_energy_scaling sets the range of energy bits to report to the microprocessor. Next, the VMI 307 object CBME_Set_Search_Time_Period is executed. This function sets the search period for all searchers under a CBME 401. The search period is nominally 50 milliseconds and is defined by the following formula:

$$timer\_constant = (input\_chipping\_rate * search\_period)/256$$

As an example, presume that the desired search period is 50 milliseconds and that the input chipping rate is 3.84 Mcps. Then:

$$timer\_constant = (3.84E6 * 50E-3)/256 = 750$$

The minimum duration for the timer setting should be such that it does not restart a new search before the completion of the previous search.

Once the time period has been set, the VMI 307 command Searcher_New 515 is used to assign a Searcher to the newly created CBME 401 and the static attributes of the searcher are defined using VMI 307 object Searcher_set_existing_mobile_static_attributes. In one embodiment, because the Searcher is set up as an ˋ existing mobileˋ searcher the following conditions must be satisfied before a Searcher is started: (i) Searcher_set_existing_mobile_static_attributes must be called, (ii) the Searcher 413 must be added to an uplink 403, and (iii) a Combiner 411, with at least one Finger 417 must have been added to uplink 403 and the Combiner 411 must have been started.

Step 9: (lines 368-392) Once a Searcher 413 has been defined, a Searcher DSM 421 is created and assigned to the Searcher. Using VMI 307 objects, a Searcher DSM 421 is created and assigned to a Searcher in three stages (i) setting up the Searcher DSM 421 (lines 368-378), (ii) setting up the state of Searcher DSM 421 (lines 379-387), and (iii) assigning the Searcher DSM 421 to the Searcher 413 (lines 388-390). More specifically, in order to set up a Searcher DSM 421, the VMI 307 object CBME_set_DSM_subchip_phase is used to configure the DSM subchip phase. Then, the VMI 307 object Searcher_DSM_new is used to obtain a searcher DSM 421 on lines 376 and 377 of the illustrative code. Each state of the Searcher DSM 421 is then set up using the VMI 307 object Searcher_DSM_set_state_attributes on lines 382 through 386 of the illustrative code. Once each state of the Searcher DSM 421 has been set, the Searcher DSM is assigned to the searcher 413 that was defined in step 8. Further, in line 392 of the illustrative code, the Searcher 413 is added to the Uplink 403 that was associated in step 5 with the newly created CBME 401.

Step 10: (lines 393-396) In the final step of this illustrative example, Searcher 413 is started with VMI 307 object Searcher_start 521. The process ends on line 396 of the illustrative code with a return to the calling function.

Application Translation

A sophisticated virtual machine interface (VMI) has been described. Further, the function of several VMI objects or procedures in accordance with one embodiment of the present invention have been introduced. In addition, the detailed processing steps performed by two such VMI objects, Finger_new 541 (FIG. 11) and Searcher_new 515 (FIG. 12) have been described. From these examples, one of skill in the art will appreciate that the VMI 307 of the present invention facilitates the rapid adaptation of a reconfigurable wireless network communication apparatus from supporting one communication protocol, such as CDMA, to supporting another communication protocol, such as a different form of CDMA or, indeed, even TDMA.

Figure 13:
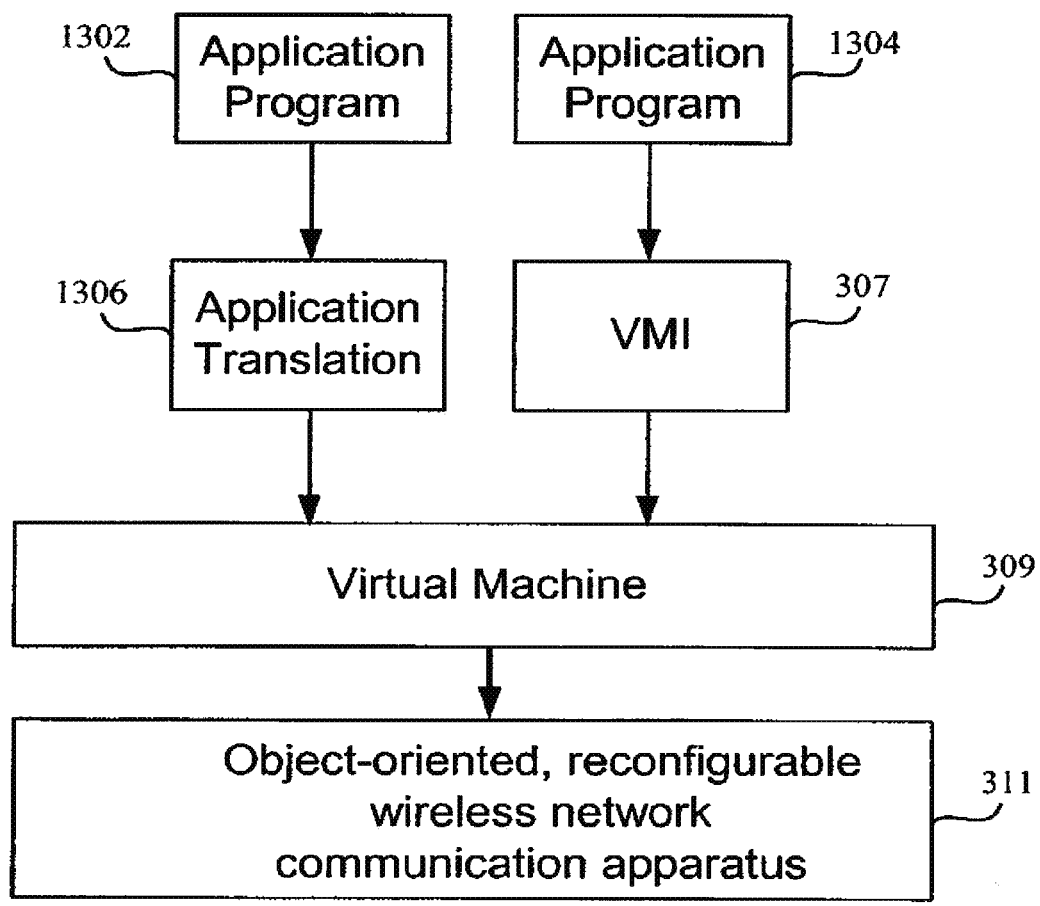
FIG. 13 is a flowchart contrasting the layers used by various application programs in accordance with one embodiment of the present invention.

The VMI 307 of the present invention is an example of an approach to providing high level programming support for a reconfigurable wireless network communication apparatus. Such high level programming frees a programmer from the intricacies of setting the appropriate state for each of the hardware kernels as is otherwise necessary to support a given communication protocol. Referring to FIG. 13, a programmer uses VMI 307 by writing Application programs 1304 which include VMI function calls.

As shown in FIG. 13, the methods of the present invention provide an even higher level of programming control over an apparatus 311. For instance, Application programs 1302 are in general higher level programs for configuring an apparatus 311 than Application programs 1304. Application translation mechanism 1306 translates Application program 1302 into a language recognized by virtual machine 309. In some embodiments, Application Translation 1306 translates Application program 1302 into instructions that are recognized directly by reconfigurable wireless network communication apparatus 311 and a virtual machine 309 is not used. In other embodiments, Application Translation translates Application program 1032 into instructions that include VMI instructions. Exemplary codes lines 301 through 396, above, detail an exemplary Application program 1304 whereas Exemplary code line 401, below, illustrates an exemplary Application program 1302.

In FIG. 13, the relationship between an Application program 1302 and an underlying object-oriented, reconfigurable wireless network communication apparatus 311, in accordance with one embodiment of the present invention, is detailed. One characteristic of Application program 1302 is that it uses a limited instruction set to reconfigure the communication protocol used by the associated reconfigurable wireless network communication apparatus 311. For example, in one embodiment, a representative Application program 1302 that requests a mobile station to communicate using wideband CDMA (WCDMA) protocol has the form of illustrative code line 401:

(401) Set_Communication_Protocol=WCDMA;

A comparison of illustrative code lines 301 through 396, which represents a program of format 1304 (FIG. 13), to the program represented by illustrative code line 401, which represents a program of format 1302, provides one example of how usage of an application translation 1306 layer can be used to simplify the task of a programmer who is reconfiguring a reconfigurable wireless network communication apparatus 311 to support a different communication protocol.

While FIG. 13 distinguishes between an Application program 1302 and 1304, the present invention contemplates any number of variants of Application program 1302 and 1304. For example, in some embodiments, Application translation 1306 uses VMI objects 307 as well as a scan chain binary to support an Application program 1302. In other embodiments, Application translation 1306 uses VMI objects 307 and does not use a scan chain binary.

Figure 14:
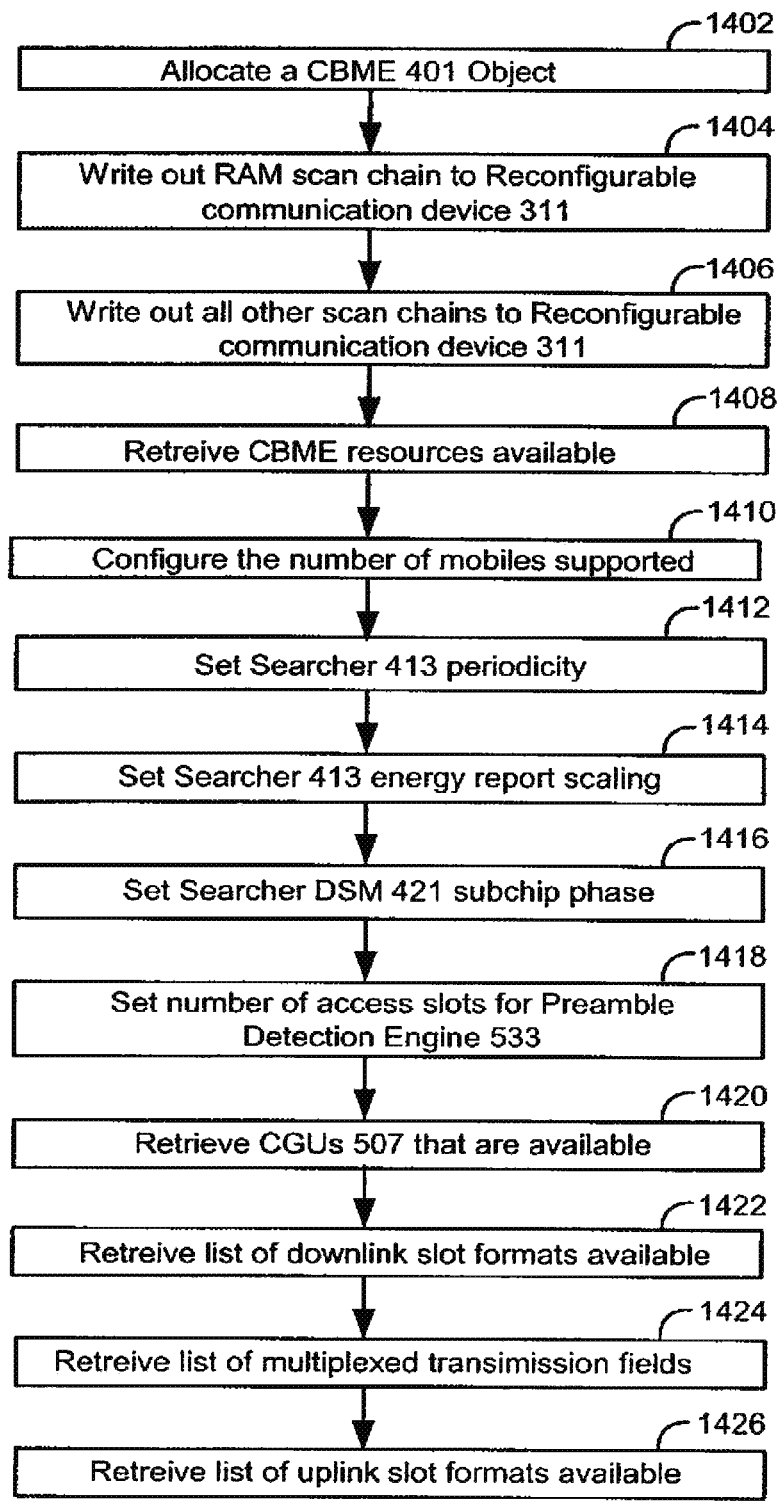
FIG. 14 is a flowchart illustrating the processing steps associated with an translation layer in accordance with one embodiment of the present invention.
Figure 15:
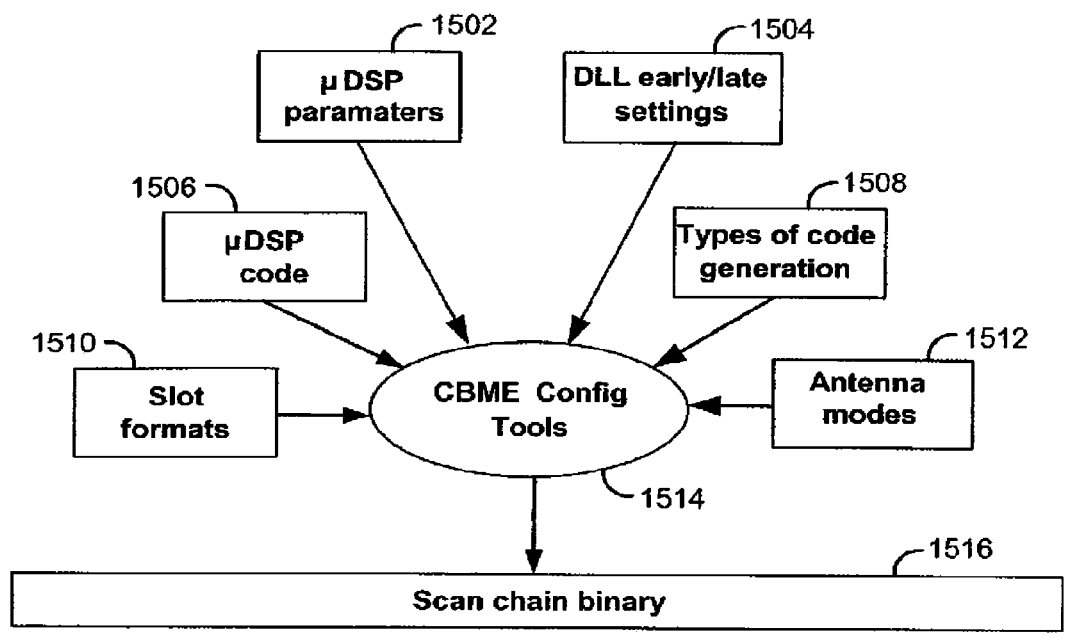
FIG. 15 is a diagram illustrating parameters that are configured in a scan chain binary.

Reference will now be made to FIGS. 14 and 15 in order to illustrate the advantage of one embodiment of the present invention in which an Application program 1302 (FIG. 13) is used to set the communication protocol for a basestation. In particular, FIG. 14 details the processing steps that are performed in response to the execution of an Application program 1302 such as the one provided by illustrative code line 401 above.

In processing step 1402, application translation 1306 allocates a CBME object 401 using a software routine such as CBME_new 503. In processing step 1404 the RAM scan chain is sent to the basestation using a VMI 307 software routine such as CBME_scan_chain_write. Processing step 1404 is used to initialize a number of on-board CBME RAMs within the basestation. Each of these RAMs can be of a different bit width and word depth. In the embodiment shown in FIG. 14, the RAM CBME scan chain is separated from writing from other scan chains because writing from the RAM scan chain corrupts the data from other scan chains. In processing step 1406, all other scan chains are written to the CBME.

The scan chains that are written to the basestation are summarized in FIG. 15. In FIG. 15, CBME Config Tools 1514 are used to write a scan chain binary 1516 based on appropriate parameterization of .mu.DSP parameters 1502, DLL early/late settings 1504, .mu.DSP code 1506, types of code generation 1508, slot formats 1510, and antenna modes 1512. Scan chain binary 1516 therefore consists of microcode for CBME processor elements and parameters for CBME RAM which set items such as decimator taps, interpolator taps, DLL taps, DLL microcode, rate selection, PDE vs. FHT, bypass decimator mode selection, enable/disable TFCI input, PDEs antenna selection, CGU polynomials, and CGU microcode as well as many other hardware settings.

In processing step 1408, the resources available within reconfigurable wireless network apparatus are determined using a querying routine such as VMI 307 object CBME_Get_Resource_Attributes. Processing step 1408 will return the maximum number of fingers available to CBME 401 at the input clock rate supplied by the basestation. In processing step 1410 a determination is made on how many mobiles to support. This decision is based on the number of fingers available to CBME 401 that was calculated in processing step 1408. Further, in processing step 1410, for each mobile station that will be supported by CBME 401, a decision is made on the initial number of tracking fingers available to the mobile. In one embodiment, processing step 1410 is executed using VMI 307 object CBME_set_mobile_resources.

In processing step 1412, the search periodicity of each searcher that will support CBME 401 is set using a routine such as VMI 307 object CBME_set_search_periodicity. Further, in processing step 1414, the energy range limits that each searcher will be allowed to report is defined using a routine such as VMI 307 object CBME_set_searcher_energy_scaling. In processing step 1416 the subchip phase of the searcher DSM associated with each searcher that will support the CBME is set using a routine such as VMI 307 object CBME_set_DSM_subchip_phase.

In processing step 1418, Preamble Detection Engine (PDE) parameters are defined. Each PDE is assigned a specific mode of operation and an access slot within the basestation. In some basestations in accordance with the present invention, a PDE can be associated with one to eight antennas depending on its mode. In some embodiments, the VMI 307 function CBME_Set_PDE_Num_Slots configures the total number of access slots for the specific communication standard requested by application program 1302 (FIG. 13) as well as the number of PDE time slots.

In processing step 1420, the number of CGUs that are available in the basestation is obtained using a command such as VMI 307 object CBME_get_CGU_list. Then, in processing step 1422, the list of downlink slot formats that are available on the CBME is retrieved. In processing step 1424, the list of multiplexed transmission fields available within the basestation is retrieved using a routine such as VMI 307 object CBME_get_downlink_field_list. Finally, in processing step 1426, the uplink slot formats that are available are retrieved using a routine such as VMI 307 object CBME_get_uplink_slot_format_list.

The VMI of the present invention may be implemented in conjunction with any suitable operating system: real time operating system (RTOS) or non-RTOS. For example, in one embodiment of the invention, the VMI is integrated with a real time operating system (RTOS). In RTOS environment, any preemptive, multi-tasking operating system that supports counting semaphores may be used to support the VMI. A typical example of non-RTOS integrated with the VMI of the present invention is a round robin based operating system.

Alternative Embodiments

While reference was made to a Cellular Basestation Modem Engine (CBME) object 401 when describing VMI 307, it will be appreciated that VMI 307 may be used not only for changing or modifying the attributes of one or more communication protocols used by a basestations, but in fact, the communication protocol used by any reconfigurable wireless network communication apparatus including a mobile. Accordingly, in such alternative embodiments, parameters within the CBME object 401 may be modified, added or deleted in order to adopt to the specific hardware attributes of a particular reconfigurable wireless network communication apparatus.

While VMI 307 objects were typically referred to as objects such as those found in an object oriented language, it will be appreciated that this representation serves merely as an example. In various embodiments, the VMI 307 software objects (objects) of the present invention are defined as objects, object classes, sets of objects, sets of object classes, procedures, sets of procedures, functions, sets of functions, or related software routines. What is common to all VMI 307 software objects of the present invention is that they run to a completed state when called. This feature is advantageous because it allows the software VMI 307 objects of the present invention to be operated in an operation system free environment. As used herein, a completed state comprises either a successful operation, such as the acquisition of a finger kernel by Finger_new 541, or an error code upon failure to achieve a task.

CONCLUSION

A VMI and API have been described in conjunction with a reconfigurable wireless network communication apparatus. Unlike conventional wireless communication apparatuses, the present invention provides a flexible and efficient platform that can easily adapt to various wireless communication protocols. Also, the VMI and API of the present invention abstract the details and specifics of the underlying communication hardware so that a programmer can prepare an application program without having to change or know the specific configuration requirements of the underlying hardware.

As described above, the VMI of the present invention provides a programmer interface to the underlying CBME hardware kernel, providing reconfigurability and flexibility necessary to take advantage of the reconfigurability and flexibility of the underlying CBME kernel. The VMI of the present invention synchronizes the hardware kernels, which comprise the CBME, with corresponding software objects so that a manipulation of the VMI objects causes an analogous change in the hardware. In one embodiment, each software object has one or more corresponding hardware components in the underlying hardware CBME.

The foregoing-description, for purposes of explanation, used specific nomenclature to provide a thorough understanding of the invention. However, it will be apparent to one skilled in the art that the specific details are not required in order to practice the invention. In other instances, well known components and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. Obviously, the embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A method for reconfiguring a wireless network communication apparatus comprising:
providing, by a virtual machine interface, a library of software calls for application programs;
calling a plurality of software objects, said software objects having information as to types and numbers of software objects required to perform a particular communication protocol;
translating the application programs by an application translation layer into lower level machine code that is required to control the reconfigurable wireless network communication apparatus, said translating step indirectly manipulating software objects in the virtual machine interface; and
assigning relevant parameter values to the software objects in accordance with the particular communication protocol.

2. The method of claim 1, wherein the calling step comprises providing an application program with information as to the type of communication protocol of interest.

3. The method of claim 1, wherein the calling step comprises making calls to software objects in an application program interface.

4. The method of claim 1, wherein the calling step comprises making calls directly to software objects in a virtual machine interface.

5. The method of claim 1, further comprising issuing machine readable instructions to the reconfigurable wireless network communication apparatus for execution.

6. The method of claim 1, further comprising initially selecting a communication protocol.

7. The method of claim 1, wherein there is at least one hardware kernel assigned to the wireless network communication apparatus for each software object.

8. An apparatus for reconfiguring a wireless network communication apparatus comprising:
a processor running an application program configured to call a plurality of software objects, said software objects having information as to types and numbers of software objects required to perform a particular communication protocol; and an application translator configured to translate application programs into lower level machine code that is required to control the reconfigurable wireless network communication apparatus, said application translator being configured to indirectly manipulate software objects in a virtual machine interface, wherein the virtual machine interface is configured to provide a library of software calls for the application programs;

wherein relevant parameter values are assigned to the software objects in accordance with the particular communication protocol.

9. The apparatus of claim 8, wherein the application program is further configured to make calls to software objects in an application program interface.

10. The apparatus of claim 8, wherein the application program is further configured to make calls directly to software objects in a virtual machine interface.

11. The apparatus of claim 8, further comprising a virtual machine configured to issue machine readable instructions to the reconfigurable wireless network communication apparatus for execution.

12. The apparatus of claim 8, wherein a communication protocol is initially selected.

13. The apparatus of claims 8, wherein there is at least one hardware kernel assigned to the wireless network communication apparatus for each software object.

14. A non-transitory digital storage medium having stored thereon a computer program with a program code for performing, when the program is executed on a computer, a method for reconfiguring a wireless network communication apparatus, comprising:

providing, by a virtual machine interface, a library of software calls for application programs;

calling a plurality of software objects, said software objects having information as to types and numbers of software objects required to perform a particular communication protocol;

translating the application programs by an application translation layer into lower level machine code that is required to control the reconfigurable wireless network communication apparatus, said translating step indirectly manipulating software objects in the virtual machine interface; and assigning relevant parameter values to the software objects in accordance with the particular communication protocol.

* * * * *